(12) United States Patent
Soni et al.

(10) Patent No.: US 12,470,542 B2
(45) Date of Patent: Nov. 11, 2025

(54) SYSTEMS AND METHODS FOR REMOTE CONTROL OF A LIFE-CRITICAL MEDICAL DEVICE

(71) Applicant: GE Precision Healthcare LLC, Wauwatosa, WI (US)

(72) Inventors: Harkikkumar Kiritkumar Soni, Bangalore (IN); Sharath Kottadamane, Bangalore (IN); John Page, Verona, WI (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 297 days.

(21) Appl. No.: 17/918,811

(22) PCT Filed: Apr. 16, 2021

(86) PCT No.: PCT/US2021/027842
§ 371 (c)(1),
(2) Date: Oct. 13, 2022

(87) PCT Pub. No.: WO2021/212086
PCT Pub. Date: Oct. 21, 2021

(65) Prior Publication Data
US 2023/0111204 A1 Apr. 13, 2023

(30) Foreign Application Priority Data
Apr. 17, 2020 (IN) .............................. 202041016573

(51) Int. Cl.
*H04L 9/40* (2022.01)
*G16H 40/67* (2018.01)
*G06F 3/04847* (2022.01)

(52) U.S. Cl.
CPC .......... *H04L 63/083* (2013.01); *G16H 40/67* (2018.01); *G06F 3/04847* (2013.01)

(58) Field of Classification Search
None
See application file for complete search history.

(56) References Cited

U.S. PATENT DOCUMENTS

2008/0306759 A1* 12/2008 Ilkin ...................... G16H 40/63
715/765
2015/0231027 A1* 8/2015 Lurie ................... A61H 31/008
601/41

(Continued)

OTHER PUBLICATIONS

EP application 21788484.0 filed Oct. 7, 2022—extended Search Report issued on Mar. 13, 2024; 15 pages.

*Primary Examiner* — Jeffrey C Pwu
*Assistant Examiner* — Mayasa A. Shaawat

(57) ABSTRACT

Systems and methods are provided herein for remotely controlling a life-critical medical device. In one example, a system includes a life-critical medical device communicatively coupled to a remote device and configured to supply a medical therapy to a patient, the life-critical medical device including a display and memory storing instructions executable to output, to the display, a graphical user interface (GUI) that displays a plurality of real-time machine settings of the life-critical medical device, responsive to a first user input, display, via the GUI, a remote control panel including a session code usable to authenticate the remote device, and responsive to receiving an indication from an access server that the remote device has been authenticated, display, on the GUI, a notification indicating that the life-critical medical device is currently controlled by the remote device.

17 Claims, 19 Drawing Sheets

(56) References Cited

U.S. PATENT DOCUMENTS

| 2017/0000412 A1* | 1/2017 | Scott | A61B 5/02055 |
| 2019/0392124 A1* | 12/2019 | Mueglitz | G16H 40/67 |
| 2020/0121199 A1* | 4/2020 | Freeman | G16H 40/60 |

* cited by examiner

SYSTEMS AND METHODS FOR REMOTE CONTROL OF A LIFE-CRITICAL MEDICAL DEVICE

CROSS-REFERENCE TO RELATED APPLICATIONS

The present application is a national stage filing of PCT/US2021/027842, filed on Apr. 16, 2021, which claims priority to Indian Patent Application number 202041016573, filed on Apr. 17, 2020. The entire contents of the above-listed applications are incorporated by reference herein in their entirety.

FIELD

Embodiments of the subject matter disclosed herein relate to patient monitoring during perioperative care, and more specifically to remote control of a life-critical medical device.

BACKGROUND

Certain medical procedures, such as surgery, may require various sub-procedures to be performed to prep the patient for surgery, maintain the patient in a certain condition during surgery (e.g., anesthetized), and help the patient recover after surgery. Such sub-procedures that are performed in support of a main procedure may be referred to as perioperative care. Perioperative care of patients in a hospital or other medical facility may include multiple patient monitoring devices monitoring multiple patients. Thus, to ensure a rapid response should a patient's condition deteriorate, near-continuous monitoring of the output from the multiple monitoring devices may be necessary. Further, coordination of patient care among all the care providers may be complicated or time-consuming, further stretching care provider resources. Additionally, the presentation of patient medical information to the care providers may require multiple time-consuming and cumbersome requests or searches for information.

BRIEF DESCRIPTION

In one embodiment, a system includes a life-critical medical device communicatively coupled to a remote device and configured to supply a medical therapy to a patient, the life-critical medical device including a display and memory storing instructions executable to output, to the display, a graphical user interface (GUI) that displays a plurality of real-time machine settings of the life-critical medical device, responsive to a first user input, display, via the GUI, a remote control panel including a session code usable to authenticate the remote device, and responsive to receiving an indication from an access server that the remote device has been authenticated, display, on the GUI, a notification indicating that the life-critical medical device is currently controlled by the remote device.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

Figure 1A:
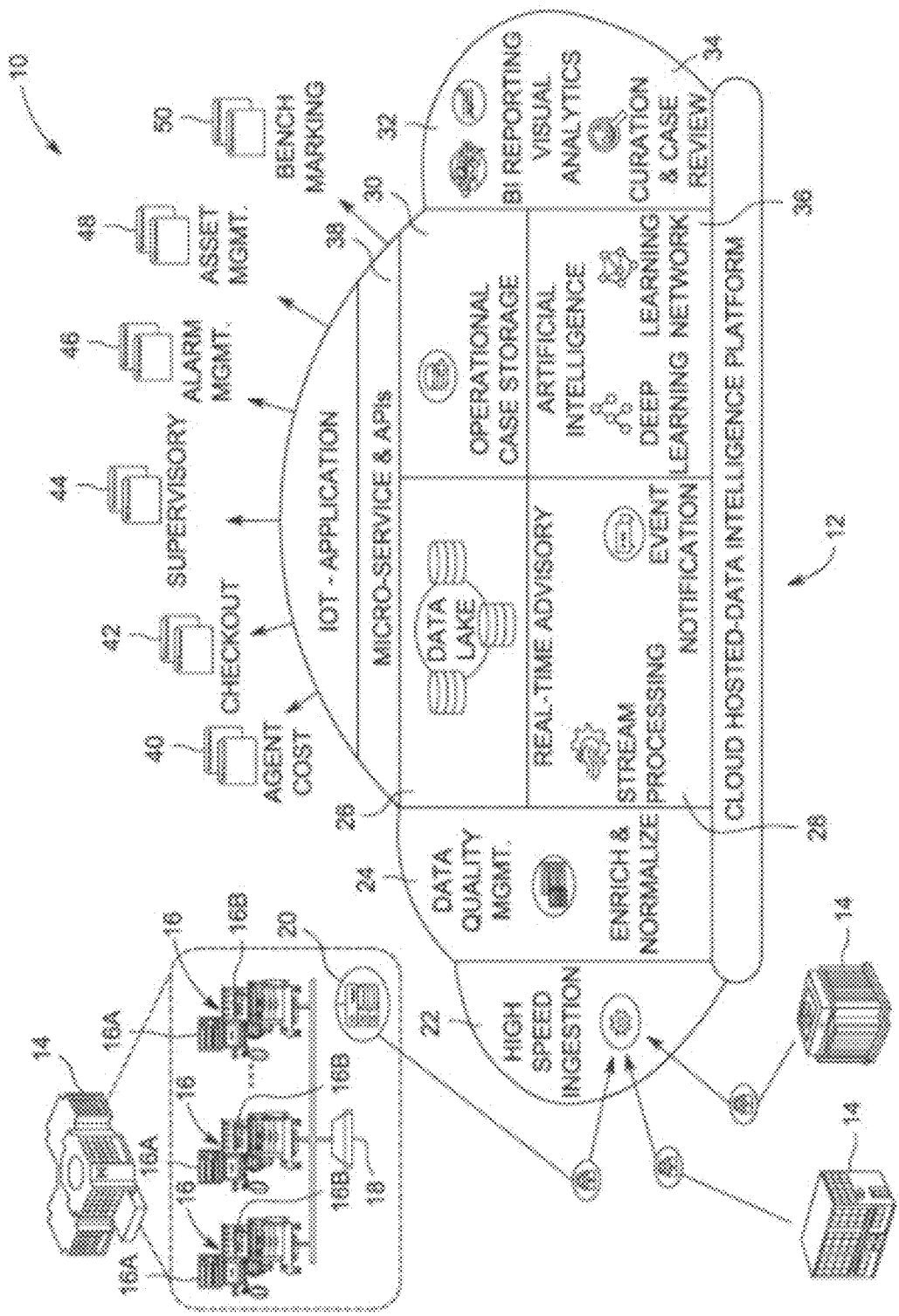
FIGS. 1A and 1B schematically show an example system for perioperative care and supervision including a supervisory application.

Embodiments of systems and methods as disclosed herein to facilitate remote control of one or more life-critical medical devices, such as an anesthesia machine, from a remote device. As used herein, a remote device may refer to a computing device that can be operated remotely (e.g., in a different room) from a life-critical medical device and is communicatively coupled to the life-critical medical device. The remote device may be operated by a clinician, such as a supervising anesthesiologist. To enable remote control of the life-critical medical device by the remote device, the remote device may be authenticated by an authentication routine that demands the remote device be in proximity to the life-critical medical device, such as by utilizing a session code that is generated at and displayed on the life-critical medical device. Once control of the life-critical medical device has been ceded to the remote device, the user of the remote device may change desired settings of the life-critical medical device directly from the remote device. By using an authentication routine that demands proximity to the life-critical medical device, security issues associated with remote authentication may be avoided.

The remote control of the life-critical medical device by the remote device may be facilitated by a supervisory application that is also operable to facilitate perioperative care for a plurality of patients, and supervision of a plurality of care providers attending to the plurality of patients. To facilitate the perioperative care and supervision described herein, the systems and methods as disclosed herein collect and process a wide variety of medical device data. Medical device data includes physiological data (also referred to as patient monitoring data) that is acquired from a patient by a medical device and machine data collected internally from the medical device itself. Machine data may include alarms, device status, settings, messages, and measured operational data. Machine data may further include settings and values that represent specific actions taken with the medical device for example, in response to automated controls or due to clinician inputs. For example, in an anesthesia delivery machine, this may include changes to oxygen and/or anesthetic agent concentrations. The machine data may further include clinical and/or technical alarms initiated by the medical device or device diagnostic information. Still further examples of the machine data include proactive or predictive service alerts from the medical device, maintenance checkout information, and/or processor clock cycle signals or power signals or other operational signals from various components of the medical device indicative that the medical device is turned on, in use, in operation, held in a stand by condition, or turned off.

The medical device data can be collected in time series format as provided from the medical devices themselves. As used herein, the time series format of the medical device data can include waveforms, binary data, numeric data, and/or textual data in a time series format. Embodiments of the systems and methods as disclosed herein receive the medical device data from the medical devices at a frequency similar to the frequency at which it is produced by the medical device. In embodiments, this increased velocity of the received data and the monitoring and analysis of medical device machine data can enable improved monitoring systems and methods as disclosed herein. As described in further detail herein, embodiments of systems and methods support high speed data ingestion, enrichment, normalization, and data curation of the medical device data. The medical device data can undergo real time analysis and further enrichment of the data with event detection and notation. While all of the medical device data can be saved for retrospective and automated machine learning and analysis, event detection and notation can be used to create further exemplary files of medical device data stemming from particular events or conditions which can be used as exemplary or case study data for further analysis.

The medical device data may be supplied to one or more care providers, such as a supervising anesthesiologist, nurse anesthesiologists, and other care providers. In particular, the medical device data may be supplied to the supervising anesthesiologist or other supervising care provider via the supervisory application that facilitates presentation of the medical device data in real-time or near real-time via one or more graphical user interfaces that may be displayed on a device of the supervising care provider, such as a mobile device (e.g., smart phone, tablet, wearable). The supervisory application may facilitate display of medical device data, including physiological data and medical device setting/parameter data, for a plurality of patients and for a plurality of different patient monitoring parameters to the supervising care provider. The displayed medical device data for the plurality of patients may be displayed simultaneously in a multi-patient graphical user interface (GUI), which may allow the supervising care provider to easily monitor patient status for each patient, even if the care provider is located away from the patient(s). When additional information for a specific patient is desired, the supervisory application may generate a single-patient GUI that provides more detailed medical device data for the patient.

The supervisory application may also monitor patient status, via the medical device data, and may output various notifications, such as alarms, when patient status changes or a specified patient monitoring parameter or combination of parameters (such as blood oxygenation) reaches a predefined condition relative to a threshold (e.g., drops below a threshold) or changes over time. The supervisory application may also facilitate communication between the supervising care provider and one or more subordinate care providers that may be in a room with a patient while the supervising care provider is located in a different room or area of the medical facility. For example, a subordinate care provider may send a request, via an in-room GUI of the supervisory application that is executed on a device of the subordinate care provider, for a consultation from the supervising care provider, which may be received by the supervising care provider's device and output to the supervising care provider via a GUI of the supervisory application. The in-room GUI may also facilitate text or voice messaging between the subordinate care provider and the supervising care provider.

The supervisory application may also generate a trends GUI that may be output on the supervising care provider's device. Via the trends GUI, the supervising care provider may assess, for a plurality of selected patient monitoring parameters, change in medical device data over time. The trend for each selected patient monitoring parameter may be displayed simultaneously in a time-aligned fashion. Further, a relative change in each patient monitoring parameter over a specified time duration may be determined and displayed in response to a single user input.

The various GUIs and functions of the supervisory application described above may allow for a single supervising care provider to simultaneously monitor multiple patients during respective medical procedures, such as surgery. While each patient may be attended to by multiple care providers during the medical procedure, such as one or more surgeons, nurses, medical technicians, etc., certain supervising care providers, such as anesthesiologists, may attend to multiple patients at once and may oversee a plurality of subordinate care providers, such as nurse anesthesiologists. As the number of subordinate care providers increases relative to the number of supervising care providers, and as medical procedures become more complex, the need for a supervising care provider to be able to monitor patients and oversee subordinate care providers remotely has increased. For example, a supervising anesthesiologist may be scheduled to initiate and monitor an induction phase of anesthesia for a patient, which may demand the supervising anesthesiologist be in the operating room with the patient during that time. However, the supervising anesthesiologist may also be attending to six other patients that are in the maintenance phase of anesthesia, with each of the six other patients being monitored by an in-room nurse anesthesiologist. If an event were to occur to one of the six other patients that demanded the care of the supervising anesthesiologist, there may be a delay from when the supervising anesthesiologist is notified of the event to when the supervising anesthesiologist could actually arrive to care for the patient. However, via the supervisory application described herein, the supervising care provider may be able to monitor patient status for all patients from any location, and may be able to adjust life-critical medical device settings and/or instruct subordinate care providers from afar. In doing so, patient care may be improved.

The supervisory application may facilitate the display of real-time medical device data obtained and/or determined from a plurality of medical devices monitoring a plurality of patients. The real-time medical device data may be displayed via various graphical user interfaces (GUIs). As an example, a single-patient GUI may be displayed on a care provider device (e.g., mobile phone, tablet, and/or wearable). Via the single-patient GUI, real-time medical device data for a patient may be displayed via a plurality of patient monitoring parameter tiles. The plurality of patient monitoring parameter tiles may be scalable, modular, and customizable by the user and/or by the supervisory application to allow for easy customizability, and ease of adding new patient monitoring parameters/medical device data in the future. For example, a user of the supervisory application (e.g., a care provider such as an anesthesiologist) may create a set of rules or an algorithm (where the rules or algorithm may be referred to as an insight) that may be executed using the real-time medical device data to determine a result (e.g., a determination of procedure phase, a prediction of patient state, a recommended course of action, etc.) or a notification of patient status. When the user selects to apply the insight, the result of the insight may be displayed as a tile on the patient-specific GUI going forward, and the other patient monitoring parameter tiles on the patient-specific GUI may be adjusted (e.g., moved, resized, scaled, and so forth) to accommodate the new insight result tile. As another example, the user may select to include a real time video feed from the patient's room as a tile in the single-patient GUI (larger variety), which may require a relatively large sized tile. The remaining tiles may be rearranged (whether automatically or in response to the user) to accommodate the larger tile.

The supervisory application may further include a machine settings GUI that may be similar to the single-patient GUI or that may be viewed as part of the single-patient GUI. In the machine settings GUI, the user of the supervisory application may view current settings for a life-critical medical device. In some examples, the user of the supervisory application may be able to directly control a specific life-critical medical device via the machine settings GUI (e.g., when the remote device is authenticated for direct control of the life-critical medical device). For example, the machine settings GUI may include settings tiles that each indicate a current value for a respective machine setting. Selection of a settings tile may trigger display of a plurality of associated value tiles where other possible values for the selected machine setting may be displayed. Selection of a value tile (and confirmation of the selection) may cause a command to adjust the selected setting to the selected value to be sent to the life-critical medical device, which may automatically adjust the selected setting in response to the command. In some examples, selection of a value tile may cause a request to adjust the selected setting to the selected value to be sent to the life-critical medical device, where the request is then displayed on the life-critical medical device for an attending clinician to accept or decline the request to change the setting. In this way, control of the life-critical medical device may be instituted from a remote location either directly or indirectly, depending on specific security needs, medical protocols, patient condition/therapy situation, etc.

In addition to ensuring that security is not compromised while allowing the remote control of a life-critical medical device, the systems and methods described herein may reduce or avoid errors that may otherwise occur during hand-offs between the life-critical medical device and the remote device, errors that may otherwise occur when more than one clinician is attempting to control the life-critical medical device, and so forth. For example, real-time medical device data related to the patient connected to the life-critical medical device may be provided to the user of the remote device during authentication and hand-off via the supervisory application described herein. This real-time medical device data may include the current settings for the life-critical medical device, such that if any changes are made to the medical device settings before authentication and hand-off to the remote device is complete, those changes are presented to the user of the remote device such that the remote device always displays the current medical device settings, thus avoiding any possible issues associated with the user being presented with inaccurate/old device settings. This real-time medical device data may also include monitored patient parameters determined by other medical devices (e.g., other than the life-critical medical device). In this way, the user of the remote device may be able to make decisions about patient care, including whether or not to adjust any settings on the life-critical medical device, based on a complete picture of the patient's status. As a further example, control of the life-critical medical device may only be granted to a single device at a time. For example, control of the life-critical medical device may be performed only at the life-critical medical device until the remote device is authenticated and control is ceded to the remote device. At that time, the life-critical medical device may only be controlled by the remote device. To cede control back to the life-critical medical device, control by the remote device may be revoked via input to the life-critical medical device (and at least in some examples, not by input to the remote device). In some embodiments, control by the remote device may also be revoked via the remote device (e.g., via user input to the remote device), with confirmation by a user (e.g., an attending clinician) on the therapy machine. By demanding that the remote control by ceded and/or confirmed by a user at the life-critical medical device, accidental hand-offs when a clinician is not present to monitor/control the life-critical medical device may be avoided. Further, the authentication process described herein may allow only one user/remote device at a time to control the life-critical medical device remotely, which may prevent conflicts in control of the life-critical medical device.

The systems and methods described below are presented specifically with respect to a supervisory application configured for a clinician such as a supervising anesthesiologist overseeing a medical procedure such as anesthesia delivery during an operation. Thus, the systems and methods are presented below with respect to an anesthesia delivery machine as an example of a life-critical medical device. However, the systems and methods provided herein may be applied to other life-critical medical devices without departing from the scope of this disclosure, such as dialysis machines, ventilators, drug delivery machines, infusion pumps, and so forth.

Figure 1B:
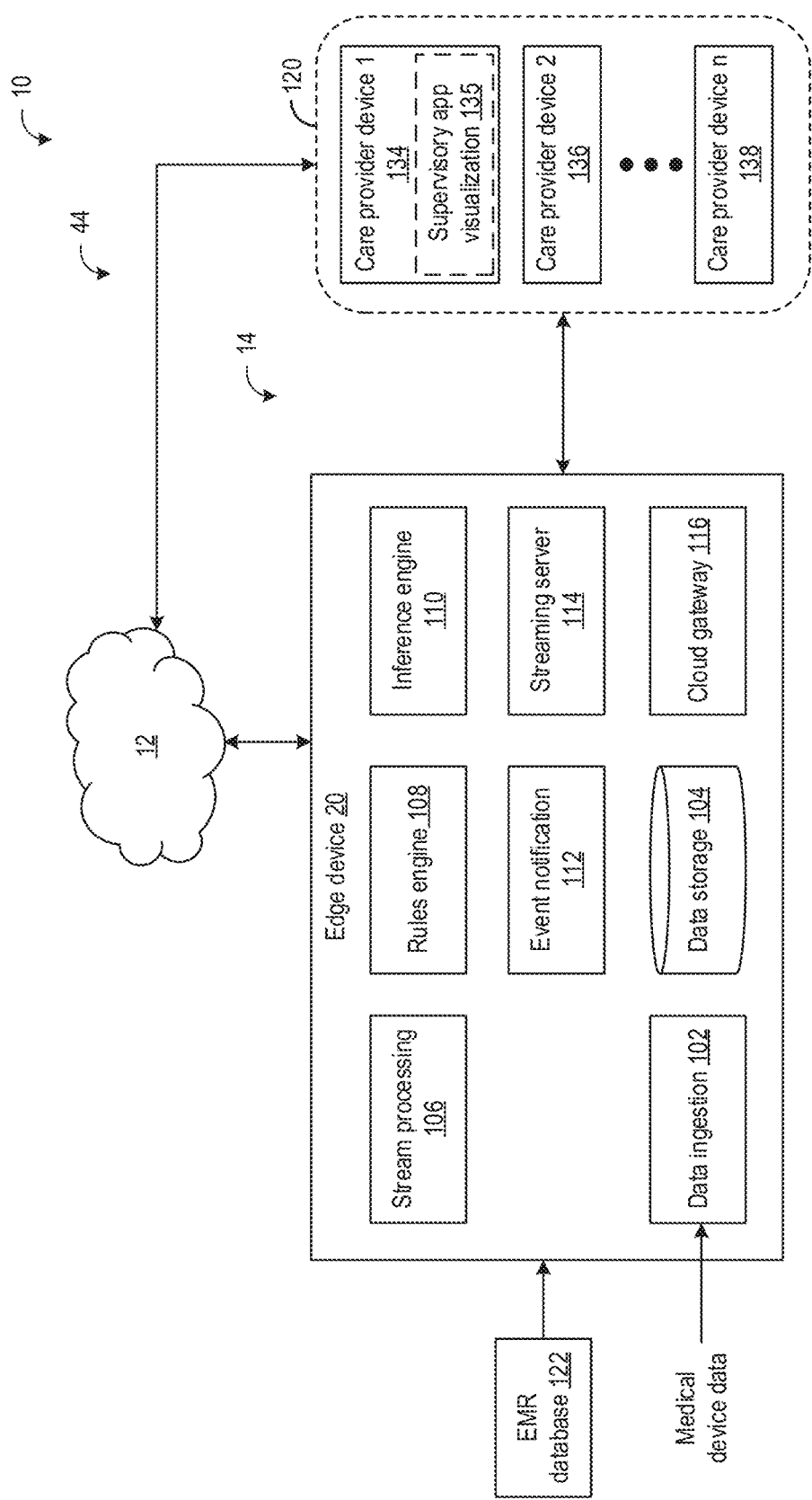

FIGS. 1A and 1B depict an exemplary embodiment of a system 10 for perioperative care and supervision. Referring first to FIG. 1A, system 10 includes a medical device data (MDD) processing system 12. The MDD processing system 12 can be implemented in a variety of hardware and/or software implementations and it should be noted that such implementations are not considered to be limiting. For example, it is contemplated that any or all of the MDD processing system 12 may be embodied exclusively in hardware, exclusively in software, exclusively in firmware or in any combination of hardware, software, and/or firmware. While the following describes exemplary methods and systems, the examples provided herein are not the only way to implement such methods and systems.

In embodiments wherein any of the claims are read to cover an entirely software and/or firmware implementation, in any embodiment, at least one of the elements is hereby expressly defined to include a tangible and non-transient computer readable medium. As used herein, the term tangible computer readable medium is expressly defined to include any type of computer readable storage and to exclude propagating signals. Additionally or alternatively, the example methods and systems may be implemented using coded instruction (e.g., computer readable instructions) stored on a non-transitory computer readable medium such as a flash memory, a read-only memory (ROM) a random-access memory (RAM), a cache, or any other storage media in which information is stored for any duration (e.g. for extended period time periods, permanently, brief instances, for temporarily buffering, and/or for caching of the information). As used herein, the term non-transitory computer readable medium is expressly defined to include any type of computer readable medium and to exclude propagating signals.

In exemplary and non-limiting embodiments of the medical device data processing system 12, the system 12 is implemented by one or more networked processors or computing devices. Processing system 12 may be implemented in a cloud computing platform and/or infrastructure. Memory and processors as referred to herein can be stand-alone or integrally constructed as part of various programmable devices, including for example, computers or servers. Computer memory of computer readable storage mediums as referenced herein may include volatile and non-volatile or removable and non-removable media for a storage of electronic-formatted information such as computer readable program instructions or modules of computer readable program instructions, data, etc. that may be stand-alone or as part of a computing device. Examples of computer memory may include, but are not limited to RAM, ROM, EEPROM, flash memory, CD-ROM, DVD-ROM or other optical storage, magnetic cassettes, magnetic tape, magnetic disc, or other magnetic storage devices, or any other medium which can be used to store the desired electronic format of information and which can be accessed by the processor or processors or at least a portion of a computing device.

The MDD processing system 12 is communicatively connected to at least one hospital network 14. Such communicative connections as well as the hospital network itself may include, but are not limited to, a wide area network (WAN); a local area network (LAN); the internet; wired or wireless (e.g. optical, Bluetooth, radio frequency (RF) network; a cloud-based computer infrastructure of computers, routers, servers, gateways, etc.; or any combination thereof associated therewith that allows the system or portions thereof to communicate with one or more computing devices.

The hospital network 14 may exemplarily be a network associated with a portion of a hospital, for example a surgery unit or department of a hospital, or may be more broadly located across medical devices of an entire hospital. It further will be recognized that while some embodiments and implementations of the systems and methods as disclosed herein may seek to operate on a single hospital or unit of a hospital, still other embodiments may connect a plurality of hospital networks, including hospitals currently owned or operated or otherwise affiliated with one another. In still further embodiments, while individual hospitals or groups of hospitals may use the MDD processing system 12, the MDD processing system 12 may receive and process information from a plurality of hospital networks including those unaffiliated with one another at the same time.

As depicted in FIG. 1A, the hospital network 14 includes a plurality of medical devices 16. The medical devices 16 may include physiological monitoring devices 16a as well as patient therapy devices 16b. Physiological monitoring devices 16a may include, but are not limited to, heart rate monitors, blood pressure oxygenation monitors, respiration monitors, ECG monitors, EEG monitors, or EMG monitors. An exemplary embodiment of an anesthesia delivery machine will be used for discussion purposes as the medical device, and more specifically as the patient therapy device 16b, although it will be recognized by a person of ordinary skill in the art that other devices, including but not limited to patient respiratory assistance devices or dialysis machines, may be further non-limiting examples of patient therapy devices (also referred to herein as life-critical medical devices). However, it will be recognized that therapy devices may also include capabilities to not only deliver patient therapy, but also to measure physiological parameters of a patient. For example, embodiments of anesthesia delivery machines may include gas analysis modules operable to measure gas concentrations expired by the patient. In some embodiments, imaging devices, including but not limited to X-ray, CT, Mill, and ultrasound devices, may be examples of medical devices 16 as contemplated within the present disclosure. Still further examples of medical devices may include video and/or audio recording devices.

In an exemplary embodiment, a limited version of the MDD processing system 12 as described herein may be implemented locally, for example as an anesthesia delivery management system 18. In such an embodiment, the anesthesia delivery management system 18 may operate to collect medical device data from a plurality of anesthesia delivery machines 16b inter alia to monitor anesthesia agent use between anesthesia delivery machines and across procedures performed by the anesthesia delivery machines in an effort to visualize anesthetic agent consumption and use as well as to quantify, monitor, and evaluate trends across all of the anesthesia delivery machines in the hospital or surgical unit.

The medical devices 16 may be communicatively connected to one or more edge devices, such as edge device 20. Edge device 20 may exemplarily be an edge processing device, cloud processing device, or internet gateway. The edge device 20 may include an internet of things (IOT) gateway which facilitates a secure communications link between the medical devices 16 at the hospital network 14 with the servers, processors, and computer readable media implementing the MDD processing system 12. In exemplary embodiments, the edge device 20 may communicate directly with one or more of the medical devices 16, or may communicate with the medical devices 16 through an intermediate network, for example, the anesthesia delivery management system 18 or another medical device data system or network.

The edge device 20 receives the medical device data as time series data for any of the medical device data available from the medical devices. As noted above, the data streams of medical device data (e.g., machine data, monitored patient physiological parameter data) are available in time series format as acquired from the medical devices and may include, but are not limited to time series information of alarms, device status, device settings, messages, and measured data. In embodiments, the medical devices may be equipped with sensors that improve the self-awareness of the medical device, e.g. sensors that monitor the function, inputs and/or outputs of various components of the medical device itself. Many such sensors are already incorporated into medical devices such as to measure compressor speeds and/or cycle times, internal pressures, voltages, clock speeds, or temperatures, or other sensors as will be recognized by a person of ordinary skill in the art or as disclosed in further detail herein.

The edge device 20 encrypts the time series formatted data and the encrypted data is transmitted using wired and/or wireless communication techniques for encrypted data to the server, processors, and data storage carrying out the MDD processing system 12. The edge device 20 continuously transmits de-identified medical device data in time series format over an encrypted communication channel to a high speed data ingestion module 22 of the MDD processing system 12. While the exemplary embodiment described herein may reference de-identified data, it will be recognized that other embodiments may use patient-identified data with appropriate considerations taken for handling patient data. The high speed data ingestion module 22 takes in the real time streams of medical device data. The data ingestion can be performed in an automated fashion and can preprocess the received streams of real time data in the time series for later processing by the MDD processing system 12. The high speed ingestion module 22 can receive concurrent data streams from multiple connected devices across multiple sites at a high incoming velocity, for example at or near the frequency at which medical devices can output data. In exemplary embodiments the high speed ingestion module 22 is scalable to continue to ingest increased bandwidth of medical device data without significant decrease in ingestion speeds.

The high speed ingestion module 22 takes the time series medical device data from the medical devices of one or more hospital networks and formats it for further processing by a data quality management module 24. In exemplary and non-limiting embodiments, the high speed injection module 22 supports open standard such as ASTMF 2761 or integrated clinical environmental (ICE). The data quality management module 24 may normalize, enrich, and tag the data streams without negatively impacting data latency. In a healthcare environment, a variety of healthcare information products and/or systems may be used to provide medical services, collect medical data, conduct medical exams, etc. However, many healthcare information systems operate using various messaging standards (e.g., Health Level 7 International (HL7 V2.x/v3), Clinical Document Architecture/Continuity Of Care Document (CDA/CCD), American Society for Testing Materials (ASTM), Digital Imaging and Communications in Medicine (DICOM), etc.)) and various standards and/or protocols (e.g., cross-enterprise document sharing (XDS.A/B) cross-enterprise document media interchange (XDM) cross-enterprise document reliable interchange (XDR), patient identifier cross-referencing/patient demographics query (PIX/PDQ) patient administration management (PAM), query for existing data (QED), national counsel for prescription drug programs (NCPDP), etc.)) that make system integration and/or communication more difficult. Thus, normalization may include reformatting of medical data to a consistent or compatible format for use within the MDD processing system 12. In an exemplary embodiment, the medical device data may be normalized into the ISO/IEEE 11073-10101 nomenclature and its extensions. In a still further exemplary embodiment, the data quality management module 24 can normalize the streams of incoming time series data by converting units of measure. The data quality management module 24 can further operate to identify and tag various types of medical device data, locations from which the medical device data was received, or time series data streams originating from the same medical device. These tags can be used as further detailed herein to identify and analyze groups of streams of time series data.

In an exemplary embodiment, the data quality management module 24 normalizes the received incoming data by transforming and/or translating the clinical data streamed from the source healthcare system or device into a canonical data model with associated metadata. The processed medical device data is stored in a data lake 26 which is exemplarily implemented in computer readable storage embodying capability to store terabytes of data. The data lake 26 is a long-term computer storage repository that holds large amounts of raw data in a native format until the data is needed. The native format may include the time series data from the medical devices which may be in waveform or binary format, audio data, image data, and/or video data. In embodiments, this can help to facilitate the ingestion of the data that may not be processed in real time but may still be taken in in real time or near real time and instead stored in the data lake until further needed. This may be facilitated by identifying particular data streams and limiting the processing of those data streams, for example by the data quality management module 24, if it is known at that time that such data stream is not being used in real time analysis. In an exemplary embodiment, the data quality management module 24 may not convert the data to a canonical data model but may still attempt to tag, enrich, or index the data to facilitate later retrieval of that data in a standardized way from the data lake 26.

In a still further embodiment, portions of the data that are stored in the data lake 26 may also be additionally stored in a graph database which may be a separate database residing on the same computer readable storage, or may be embodied on separate computer readable storage from the data lake 26. The graph database may receive the data streams of which it is known that the system may analyze trends in that data stream. The graph database may store the streams of data in a time series format in a way that facilitates trending of the data over time and appending the data with events either identified in the data itself, in one or more of the other data streams, or received by the system from an external source. These events may include, but are not limited to, medical device or clinician actions, clinical events, situations, or complications that arise during the medical procedure. The graph database may later be used by a clinician or technician to identify further relationships between trends and the data streams with other analysis as disclosed herein.

At the same time that the data is stored in the data lake 26, the enriched and normalized medical device data may be provided to a stream processing engine 28. The stream processing engine 28 identifies cases and events in the time series streams of medical device data. Identified clinical cases may be stored in an operational case database 30. Clinical cases may exemplarily include surgical and intensive care unit (ICU) cases. The clinical cases may be identified by the medical device used and the timing of the medical data in the time series of the medical device data. For example, a time series of medical device data from an anesthesia delivery machine showing a change in status turning the machine on and followed by changes to device settings and delivery and/or consumption of anesthetic agent all indicate that a clinical case has begun or is ongoing.

As noted above, the streams of time series medical device data originating from the same medical device or from the same location in a hospital may be tagged or otherwise identified as being related. These tags can be used to simultaneously analyze related data streams or combine analysis of related data streams to identify clinical cases. For example, a device status data stream analysis may be combined with a user input data stream, device setting data stream, and operational data streams to identify when the device is used and how it is used in the clinical case. This information may help to distinguish between a maintenance or checkout of the medical device by a technician from the use of the device for clinical case.

The analysis of the data streams of multiple medical devices, particularly those identified as being related or co-located may further be used to identify clinical cases. For example, coordinated or similar actions in data streams of an anesthesia delivery device and a related patient monitoring device, and/or respiratory support device and/or imaging device, etc., may further be used to identify that these devices are being used together for a clinical case. In still further embodiments, the streaming time series medical device data may be combined with information regarding scheduled clinical cases to help to further identify when and how the medical devices are used during clinical cases.

In embodiments, knowledge of a scheduled use of the medical device (e.g. anesthesia delivery machine) can be used to further identify clinical cases in the streams of medical device data. For example, input or received knowledge regarding a type and time of a scheduled procedure may help to identify the start and end of the clinical case in particular streams of medical device machine data. In an embodiment, a known schedule of use for the medical device may help to identify clinical cases from maintenance or calibration actions which may similarly require powering up and at least partial operation of the medical device.

The medical device data associated with the actions by the anesthesia delivery device and/or other medical devices during the identified clinical case may be stored in the operational case database 30. In an example, the identification of the clinical case is stored along with the other time series streams of medical device data from that anesthesia delivery machine as well as time series streams of medical device data from any physiological monitors and/or other medical devices associated with the use of that anesthesia delivery machine. In another exemplary embodiment as described in further detail, a clinical case summary with links or identifiers to the associated time series medical device data stored in the data lake 26 can be created and stored in the operational case database 30.

In an embodiment, prior to storing the clinical cases in the clinical case database 30, the clinical cases may be classified or profiled which is a technique used for data curation. The profiling of the clinical cases may be based upon, in part, the information in the clinical case summary, and as described in further detail herein, may be used to group the clinical cases into groups, for example normal cases, edge cases, and outlier cases. These determinations may be made in view of a comparison between the time series data in the clinical case against normal distributions of the same type of time series machine data in other similar clinical cases. Edge cases may be identified as borderline or ambiguous cases, not clearly defined as either normal or an outlier. In a merely exemplary embodiment, for a particular measured value or occurrence, a distribution of such occurrences may be used to establish normal, edge, and outlier cases. In a merely exemplary embodiment, a normal case may be within a standard deviation of a median value in the normal distribution while edge cases are between one and two standard deviations and outlier cases are greater than two standard deviations from the median. The categorized cases, as explained in further detail herein, for example, identified edge cases may be further investigated to create or improve event detection algorithms, rules for clinical decision support, alert algorithms, and predictive algorithms.

The stream processing engine 28 also identifies events in the time series streams of medical device data, for example in the manners as described in further detail herein and presented in business intelligence and visual analytics tools 32 which exemplarily may be presented on a graphical display communicatively connected to the medical device data processing system 12.

Once clinical cases are stored in the operational case database 30, clinical cases may be reviewed manually by a clinician or technician using a curation and case review tool 34. The curation and case review tool 34 may be presented in a graphical user interface on a graphical display and further provide inputs exemplarily through the graphical user interface for the user or technician to curate or otherwise assess the clinical cases. This can be performed for investigative, educational, and data curation purposes.

The reporting and visual analytics tool 32 can present the detected events in a variety of channels of communication. For example, the detected events may be presented visually through graphical user interfaces and graphical displays. The detected events or notifications of the detected events can also be reported by communication of events/event notifications to wearable or mobile devices and presentation of medical device data and identified events in visual form in reports and/or dashboards presented in a graphical user interface on a graphical display, as will be explained in more detail below.

The results of the streaming analytics and event detection in the time series of medical device data may be provided to an application programming interface (API) 38 for use by application developers to provide monitoring, reporting, and/or control applications based upon the analyzed streams of medical device data. Such applications may operate through a computer operating system, a website browser, or operate on a mobile computing device or wearable computing device. Non-limiting examples of applications that may leverage the analysis of the time series medical device data include, but are not limited to, an anesthetic agent cost dashboard 40, a checkout dashboard 42, a supervisory application 44, an alarm management application 46, an asset management application 48, and a benchmarking application 50.

The agent cost dashboard 40 may present medical device data regarding anesthetic agent use across clinical cases as well as between anesthesia delivery machines within a hospital network or comparatively between hospital networks. By comparatively presenting this information, anesthetic agent use and behavioral changes can be understood and undertaken to promote efficient use of anesthetic agent.

The checkout dashboard 42 may assist in monitoring the inspection and maintenance of the monitored medical devices. Medical device data such as device status and settings, as well as messages and information in machine data, may provide insight into the inspection processes for maintaining medical devices at a hospital network. The checkout dashboard may identify maintenance and/or testing events in the streams of machine data and note these identified testing events against a testing schedule, requirement (e.g., daily), or other criterion.

The supervisory application 44 may be used by attending and/or supervising anesthesiologists to more efficiently manage remote personnel, nurse anesthetists, and/or other care providers simultaneously working across multiple locations or theatres. The alarm management application 46 may report and present medical device data regarding alarm notifications and silences of alarm notifications in order to better understand and adjust alarms to improve signal to noise in alarm events and to reduce alarm fatigue by clinicians. Additional information about the supervisory application 44 is presented below.

The asset management applications 48 may present use, status, maintenance, and/or inspection information regarding medical devices (e.g. anesthesia delivery machines) or consumables used by medical devices, including components that may be frequently replaced, refilled, or refurbished during normal operation of the medical device (e.g. filters, absorbers). The benchmarking application 50 may provide further operational and quality performance across providers and/or organizations or in a comparative manner for example between hospital networks versus averages or between specific locations.

The supervisory application 44 allows for users (e.g., clinicians such as anesthesiologists, nurses, and other care providers) to view ventilator, anesthesia, and vital parameters of a plurality of patients in different locations (e.g., in different operating rooms) on various smart phones, tablets, or other computing devices associated with the users. The supervisory application 44 may include a backend that is hosted on edge device 20 and/or MDD processing system 12 as dockers/micro services and may be rendered on a user's device (such as care provider device 134 shown in FIG. 1B) using a suitable visualization platform.

FIG. 1B schematically shows example devices of system 10 via which supervisory application may be executed, including edge device 20 in communication with a plurality of care provider devices 120 via hospital network 14 and also in communication with MDD processing system 12.

As mentioned above, the edge device 20 receives the medical device data from the medical devices 16. The medical device data received by the edge device 20 may be ingested by a data ingestion module 102, which may be similar to ingestion module 22 of FIG. 1A, and stored in data storage 104. Data storage 104 may be an ephemeral datastore where the received data is stored temporarily rather than persistently. (The received data, such as the medical device data from the medical devices 16, may be sent to the MDD processing system 12 for long-term storage). Further, the received medical device data may be allocated to various micro services on the edge device 20 in order to carry out aspects of supervisory application 44, including a stream processing module 106, a rules engine 108, an inference engine 110, an event notification service 112, a streaming server 114, and a cloud gateway 116.

As explained above, the supervisory application 44 may be used by attending and/or supervising anesthesiologists to manage other care providers, such as nurse anesthesiologists and/or other subordinate care providers. The hospital/medical facility may rely on a relatively high supervision ratio (e.g., 4-10 subordinate care providers for each supervising anesthesiologist), which may increase the need for the supervising anesthesiologists to have high mobility among operating rooms while still overseeing all subordinate care providers and monitoring patient status for all procedures that may be simultaneously ongoing. The supervisory application 44 may facilitate this mobility and management by allowing supervising anesthesiologists to monitor patient status and communicate with subordinate care providers from a remote location. As will be explained in more detail below, the supervisory application 44 may present, via one or more graphical user interfaces displayed on a mobile or other device of a supervising anesthesiologist, patient monitoring parameters (e.g., ECG, heart rate, blood oxygenation) as determined from the received medical device data, procedure phase (e.g., induction, maintenance, and emergence), alarms, anesthesiology machine settings, and other relevant or selected information to a user (e.g., the supervising anesthesiologist). The processing and analysis of the time series streams of medical device data as described above in order to detect events relevant to identified cases (e.g., such as identifying a phase of anesthesia administration) may be utilized and the output of such processing and analysis may be provided to the supervisory application 44. The supervisory application 44 may provide determined values of specified patient monitoring parameters, indications of detected events, and other notifications as determined from the time series streams of medical device data to the user via the graphical user interfaces described herein.

For example, via the supervisory application 44, the user may toggle between graphical user interfaces that show limited information for a plurality of patients (a multi-patient GUI) and more detailed information for a selected patient (a single patient GUI). The user may also view, via the supervisory application 44, trends of patient monitoring data, detailed alarm/notification information, insights, and/or other information. Further, the user may communicate with other care providers, such as a subordinate care provider that is in the room with a patient, via the supervisory application 44. The user may customize which patients/rooms to view, which patient monitoring parameters to view, which alarms and insights to apply, and other parameters of the graphical user interfaces used to present the above-described information, such as a layout of each graphical user interface. Further still, via the supervisory application 44, the user may request changes to be made to the settings of a medical device currently monitoring and/or delivering therapy to a patient, such as an anesthesia machine.

The graphical user interfaces that are generated via the supervisory application 44 may be displayed on one or more suitable display devices associated with a respective care provider device and/or medical facility administration device. As shown in FIG. 1B, a plurality of care provider devices 120 may be included as part of hospital network 14, from a first care provider device 134, a second care provider device 136, and on up to an nth care provider device 138, and may be communicatively coupled to edge device 20 via hospital network 14. Each care provider device may include a processor, memory, communication module, user input device, display (e.g., screen or monitor), and/or other subsystems and may be in the form of a desktop computing device, a laptop computing device, a tablet, a smart phone, or other device. Each care provider device may be adapted to send and receive encrypted data and display medical information, including medical images in a suitable format such as digital imaging and communications in medicine (DICOM) or other standards. The care provider devices may be located locally at the medical facility and substantially fixed in place (such as in a nurses' station or in the room of a patient) and/or located locally or remotely from the medical facility and configured to move with the care provider (such as a care provider's mobile device).

When viewing graphical user interfaces generated via the supervisory application 44 via a display of a care provider device, a care provider may enter input (e.g., via the user input device, which may include a keyboard, mouse, microphone, touch screen, stylus, or other device) that may be processed by the care provider device and sent to edge device 20. In examples where the user input is a selection of a link or user interface control button of a graphical user interface, the user input may trigger progression to a desired view or state of the graphical user interface (e.g., trigger display of desired patient medical information), trigger updates to the configuration of the graphical user interface, trigger alarm, insight, and/or other notification settings to be saved, trigger changes to a machine (such as an anesthesia delivery machine), or other actions.

The devices disclosed herein, such as the care provider devices and/or aspects of the edge device 20, may each include a communication module, memory, and processor(s) to store and execute aspects of the supervisory application 44 as well as send and receive communications, graphical user interfaces, medical data, and other information.

Each communication module facilitates transmission of electronic data within and/or among one or more systems. Communication via the communication module can be implemented using one or more protocols. In some examples, communication via the communication module occurs according to one or more standards (e.g., Digital Imaging and Communications in Medicine (DICOM), Health Level Seven (HL7), ANSI X12N, etc.). The communication module can be a wired interface (e.g., a data bus, a Universal Serial Bus (USB) connection, etc.) and/or a wireless interface (e.g., radio frequency, infrared, near field communication (NFC), etc.). For example, a communication module may communicate via wired local area network (LAN), wireless LAN, wide area network (WAN), etc. using any past, present, or future communication protocol (e.g., BLUETOOTH®, USB 2.0, USB 3.0, etc.).

Each memory may include one or more data storage structures, such as optical memory devices, magnetic memory devices, or solid-state memory devices, for storing programs and routines executed by the processor(s) to carry out various functionalities disclosed herein. Memory may include any desired type of volatile and/or non-volatile memory such as, for example, static random access memory (SRAM), dynamic random access memory (DRAM), flash memory, read-only memory (ROM), etc. The processor(s) may be any suitable processor, processing unit, or microprocessor, for example. The processor(s) may be a multi-processor system, and, thus, may include one or more additional processors that are identical or similar to each other and that are communicatively coupled via an interconnection bus.

As used herein, the terms "sensor," "system," "unit," or "module" may include a hardware and/or software system that operates to perform one or more functions. For example, a sensor, module, unit, or system may include a computer processor, controller, or other logic-based device that performs operations based on instructions stored on a tangible and non-transitory computer readable storage medium, such as a computer memory. Alternatively, a sensor, module, unit, or system may include a hard-wired device that performs operations based on hard-wired logic of the device. Various modules or units shown in the attached figures may represent the hardware that operates based on software or hard-wired instructions, the software that directs hardware to perform the operations, or a combination thereof.

"Systems," "units," "sensors," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

One or more of the devices described herein may be implemented over a cloud or other computer network. For example, edge device 20 is shown in FIG. 1B as constituting a single entity, but it is to be understood that edge device 20 may be distributed across multiple devices, such as across multiple servers.

The supervisory application 44 may provide various data, notifications, and messages to the plurality of care provider devices 120. The data, notifications, and/or messages may include historical data, real-time medical device data (e.g., provided by streaming server 114), and notifications that may pushed to the plurality of care provider devices 120 from an event notification service 112 via MDD processing system 12 or another a cloud-based service.

Figure 2:
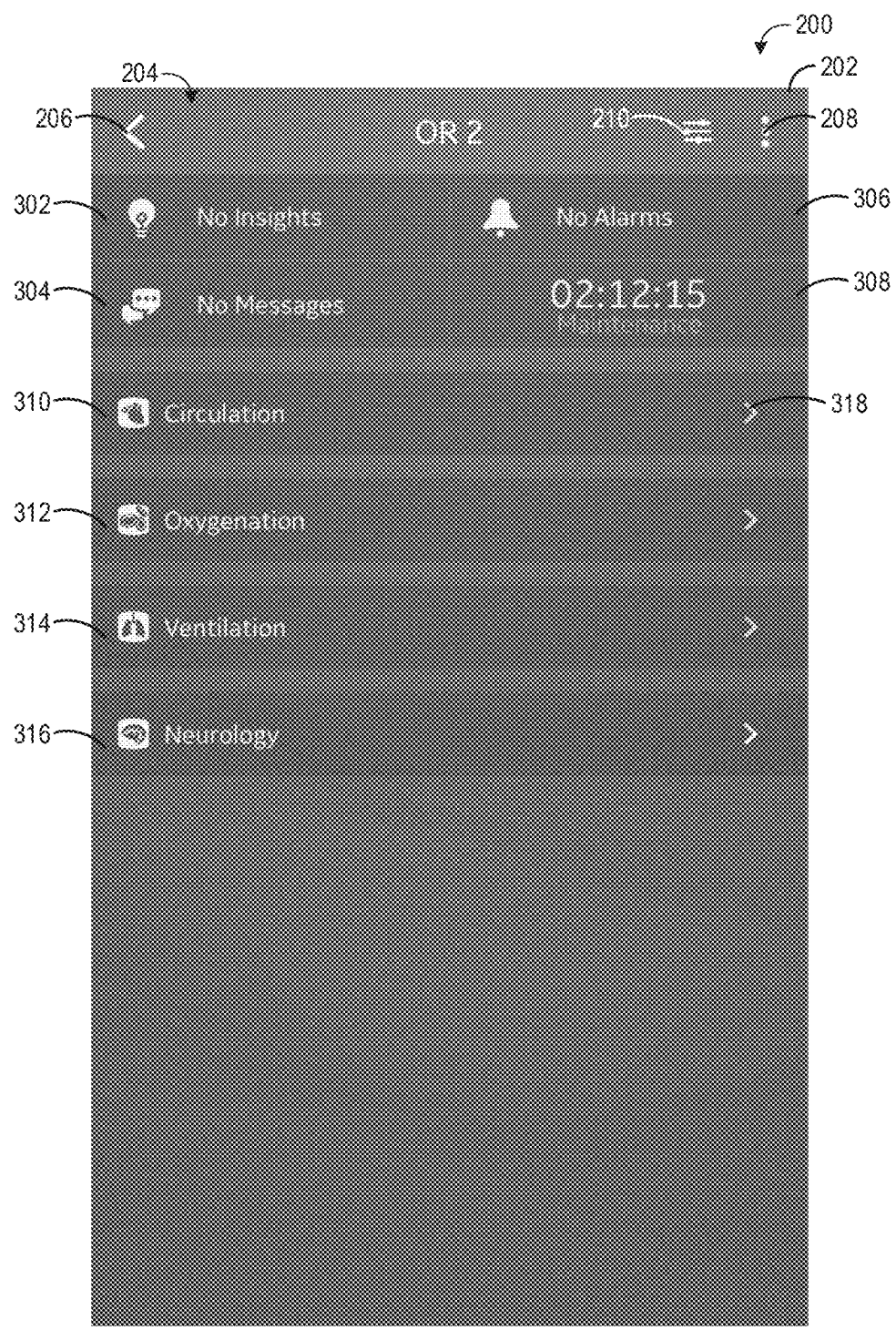
FIGS. 2-4 show an example display device displaying various views of a single-patient graphical user interface generated via the supervisory application.
Figure 4:
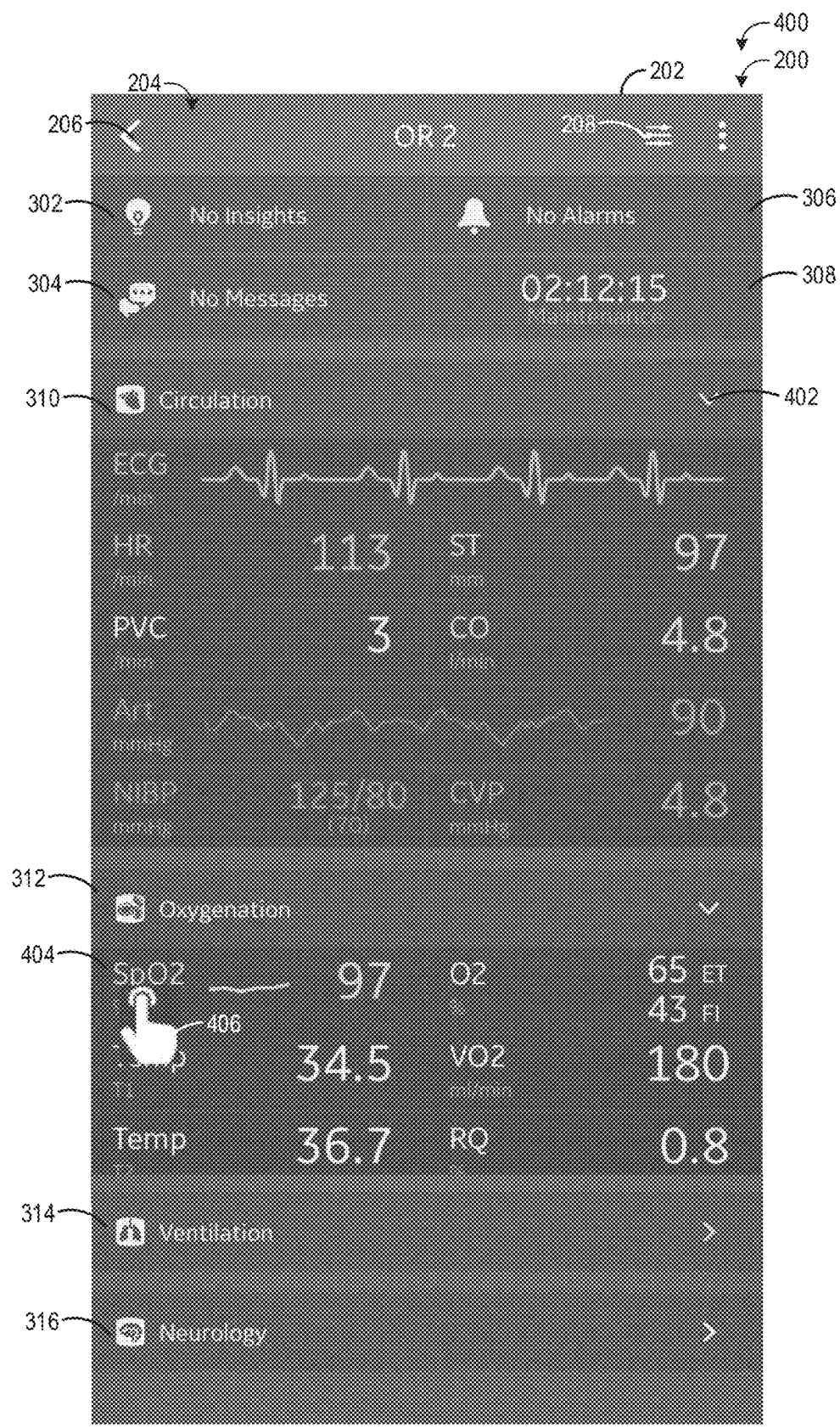

As will be explained in more detail below, the supervisory application 44 may be visualized on a care provider device in the form of one or more graphical user interfaces. The one or more graphical user interfaces may be populated with real-time patient monitoring parameters, such most-recently determined values or waveforms for heart rate, blood oxygen saturation, respiration rate, and so forth, obtained from the medical devices. When the medical device data is received by the edge device 20, some or all of the medical device data may be processed by stream processing module 106 and supplied to the streaming server 114, which may then supply the real-time patient monitoring parameter values and/or waveforms to a requesting care provider device. For example, when a user is viewing a patient-specific graphical user interface of the supervisory application 44 on care provider device 134, the graphical user interface may include tiles or other display areas where the most-recently determined values for selected patient monitoring parameters are displayed (for example, as shown in FIGS. 2 and 4 and explained in more detail below). The streaming server 114 may stream the most-recently determined values for the selected patient monitoring parameters to the care provider device 134, which may then populate the received values into the graphical user interface. The stream processing module 106 may include rule-based streaming analytics algorithms applying windowing functions (sliding, tumbling, hopping, etc.) used for waveform analysis and event detection, thereby triggering alerts, detection of surgical phases, flow analysis, triaging algorithms, etc. Furthermore, the stream processing module 106 coupled with inference engine 110 may perform predictions such as continuously predictive scoring, patient deterioration scoring, calculate risk indexes, identify early signs of trouble, sepsis prediction, onset of respiratory distress, end-of-case prediction, and clinical decision support in general.

The determination of which patient monitoring parameter values to send to which care provider device may be based at least in part on data requests sent by the care provider devices to the edge device 20. The edge device 20 may include a representational state transfer (REST) server, for example, that may receive data requests from the care provider devices 120 and may respond to the data requests by commanding the streaming server 114 to stream selected medical device data to a requesting care provider device(s). The streaming server 114 may maintain a stateful session (e.g., WebSocket) with each client (e.g., the care provider devices). The medical device data may be adapted (transformed and filtered) before being streamed to the client devices.

The data requests from the care provider devices 120 may also include requests for historical data (e.g., prior or non-real time patient monitoring parameter values). The historical data may include trends of selected patient monitoring parameters over time. For example, a trends graphical user interface may be displayed on a care provider device as part of the supervisory application 44 that shows values for selected patient monitoring parameters over time as trend lines. The trend lines may be assembled from stored medical device data (e.g., stored in data storage 104). When a user requests to view a trends graphical user interface on a care provider device, the care provider device may send a request for the trend lines that are to be displayed in the trends graphical user interface to the edge device 20, and the edge device 20 may obtain the trend lines from the data storage 104 or the edge device 20 may obtain relevant stored medical device data and the trend lines may be assembled at a different location (e.g., by the care provider device).

In some examples, users may communicate with one another via the supervisory application 44. For example, an in-room graphical user interface may be displayed on a care provider device as part of the supervisory application 44. The in-room graphical user interface may include a message view where a care provider in the room with a patient (e.g., a nurse) may communicate with another care provider located outside the room (e.g., an anesthesiologist) via text messages, for example. The messages sent and received via the supervisory application may be routed through the edge device 20 and/or the MDD processing system 12. For example, a first care provider device (e.g., care provider device 134) may send a message intended for a second care provider device (e.g., care provider device 136). The message may be sent from the first care provider device to the edge device 20 and a messaging module of the edge device 20 may receive the message, determine the intended recipient care provider device, and send the message to the intended care provider device (e.g., the second care provider device).

The supervisory application 44 may generate and/or send various alarms and notifications based on the medical device data received from the various medical devices. The alarms may include threshold-based alarms, where a notification/alarm is generated and output to one or more care provider devices in response to a patient monitoring parameter value meeting a predetermined condition relative to a threshold (e.g., an alarm may be generated and sent to a care provider device in response to blood oxygen saturation for a particular patient dropping below a threshold saturation). For example, an alarm tile may be displayed as part of a single-patient or multi-patient graphical user interface of the supervisory application 44, where the alarm tile includes an indication of how many alarms have been triggered for a particular patient, where an alarm is generated by a medical device in response to a determination that a patient monitoring parameter for a particular patient has reached a predefined condition relative to a threshold.

The alarms described above may be triggered by a medical device monitoring the patient. For example, the patient may be monitored by a pulse oximeter, which may send SpO2 data to edge device 20 directly or via an anesthesia delivery machine. If the patient's blood oxygen saturation drops below a threshold, the pulse oximeter and/or anesthesia delivery machine may send a notification to edge device 20 indicating that the patient's SpO2 value has dropped below a threshold. Edge device 20, via event notification service 112 and/or cloud gateway 116, may send a notification of the alarm to the care provider device of the care provider attending to the patient. For example, the alarms that are generated may be sent to the appropriate care provider device(s) directly via event notification service 112 or via the cloud gateway 116, which may push the alarms (and other notifications that are generated by edge device 20, as explained in more detail below) via MDD processing system 12 to the appropriate care provider device(s), even when the supervisory application 44 is in an unlaunched state on the care provider device(s).

As mentioned above, the supervisory application 44 is configured to apply insights to the received medical device data in order to provide user-selected notifications, predictions, etc., of patient status. The insights may include the rule-based streaming analytics algorithms performed by the stream processing module 106 and/or inference engine 110 described above (e.g., waveform analysis and event detection, thereby triggering alerts, detection of surgical phases, flow analysis, triaging algorithms, continuously predictive scoring, patient deterioration scoring, calculate risk indexes, identify early signs of trouble, sepsis prediction, onset of respiratory distress, end-of-case prediction, and clinical decision support). The insights may include artificial intelligence based models, such as machine learning or deep learning models. In general, any algorithm, model, or set of rules that may be applied to the medical device data in order to monitor patient state may be considered an insight. In some examples, particularly where the insight requires a high amount of processing power, the insight may be stored/executed on a cloud based device such as the MDD processing system 12.

In some examples, insights may be defined by a user according to a predefined set of parameters and a predefined set of operators and saved as a set of rules. The predefined set of parameters may include all the patient monitoring parameters (including physiological data and machine parameters/settings) that are available to the system (e.g., all the patient monitoring parameters that can be measured, inferred, or otherwise determined from the medical device data). When a parameter is selected (e.g., when a patient monitoring parameter is selected), the user may be presented with a predefined scopes (e.g., timings) to select to limit the insight to specific procedures, timing, etc. Further, when a parameter is selected, the user may be presented with predefined or adjustable thresholds to apply to the parameter. The predefined set of operators may include an "and" operator, an "or" operator, a "while or during" operator, and/or any other suitable operators that allow the user to combine multiple parameters in an insight, or allow the user to select only one parameter for the insight.

The rules engine 108 may include resources (e.g., memory and processors) of the edge device 20 allocated to store and apply sets of insight rules, which may be similar to alarms, but may be multi-modal and/or multi-parameter. The insights may be user-customized/defined. The insight rules may define a condition and a scope of each insight. For example, an insight may include a condition that defines a patient monitoring parameter and corresponding threshold value that may trigger the insight notification, such as patient heart rate being above 150 beats/minute. An insight may further include a scope, which may be a timing- or procedure-based limitation on when the condition of the insight will trigger a notification or result. For example, the scope may define the parameters during which the condition is to be applied, such as how long the condition is to persist before triggering the insight notification (e.g., five minutes), which stage of the procedure the condition is to occur in order to trigger the insight notification (e.g., in maintenance stage of anesthesia delivery), and so forth. As explained above, the user may define the condition and scope from the predefined set of parameters, and if more than one condition is desired in an insight, the user may select an operator from the predefined set of operators. When multiple conditions are included in an insight, after selecting an operator such as "and" or "or," the user may select another parameter from the set of parameters.

The insight rules may be customized by user, and thus the insight rules may define which users (and hence which care provider devices) are to receive which insight notifications. The edge device 20 may distribute medical device data streams to the rules engine 108, and the rules engine 108 may apply the stored insight rules to the incoming streams of medical device data in order to determine if any insight notifications or results should be generated. If an insight notification is to be generated, an insight notification may be generated and sent to the appropriate care provider device(s) via the event notification service 112 and/or cloud gateway 116.

In some examples, an insight may include, as an input, the result of another insight. For example, a first insight may include an algorithm that determines a current anesthesia delivery phase for an anesthesia delivery machine. The output/result of the first insight may be displayed as a tile on a GUI of the supervisory application that is displayed on a care provider device, as will be explained in more detail below. The result of the first insight may also be used as input, along with the medical device data, to a second insight. For example, the second insight may dictate that a notification be output when a selected patient monitoring parameter value reaches a threshold value (or when a change in a selected patient monitoring parameter over a particular time period reaches a threshold) when the result from the first insight indicates that the patient is in maintenance phase of anesthesia delivery. A user may select to include the result of an insight as an input into another insight via the predefined set of parameters described above. For example, when the user creates an insight or applies an insight created by another user, that insight may be included in the predefined set of parameters.

Further, insights may be shared with other users at the medical facility and/or other users at other medical facilities. Thus, when requested, insight rules may be saved at the MDD processing system 12. An insight graphical user interface of the supervisory application 44 may be displayed on a care provider device when requested. Via the insights graphical user interface, a user may search for insights defined by users at other medical facilities and/or for insights defined by users at the same medical facility as the user is located, as well as view insights defined by the user. If the user selects to apply an insight, the notification that the insight has been selected may be sent to the rules engine 108 and/or the inference engine 110 and saved as an insight rule to be applied for that user.

The inference engine 110 may be used with artificial intelligence (AI) based models, such as trained deep learning models, to process the incoming data and derive conclusions (insights) from the facts and rules contained in the various machine learning models. The inference engine 110 may be the run-time engine for AI based algorithms, such as prediction of signs of trouble, and these will be part of the inference engine 110. In addition, there may be a deep learning and/or learning network in the cloud, e.g., MDD processing system 12, to train algorithms, where very high compute and resources are necessary.

As explained above, via an insights engine feature of the supervisory application 44, users may create their own rules/algorithms from within a user interface and current available data to generate insights, based on their preconfiguration. The insights engine uses streaming, and applies windowing functions, to generate the insights. These insights are then notified to the respective users, based on the users' configuration (e.g., user-subscribed insights), using the event notification service 112. The available data to create a rule may include raw machine data, or the result of an AI algorithm powered by the inference engine 110 (e.g., another insight).

When a user creates their own insight (e.g., rule/algorithm) through the insights engine, they have the opportunity to share that the insight with other users, so other users can adopt and use the same insight. For example, a user may share an insight within the user's institution and other users can see how many people are using the insight and adopt the insight for their own patients/rooms. A user may also see rules (or "insights") that others on the platform outside the user's institution globally have set up, and see the popularity of each insight, and if desired, select one or more of the insights to be applied for their own patients/rooms.

Thus, as explained above, the supervisory application 44 may include a backend hosted on the edge device 20, where the backend includes a plurality of micro services, such as the rules engine 108, inference engine 110, event notification service 112, and streaming server 114. The supervisory application 44, via the backend/edge device 20, may output real-time medical device data to a plurality of care provider devices, trends of medical device data, messages, alarms, insight notifications/results, and/or other information as requested by the front end of the supervisory application 44 that is executed on the care provider devices. The front end of the supervisory application 44 may include a supervisory application visualization platform that may be stored on each care provider device. The supervisory application visualization platform, such as supervisory application visualization platform 135 stored on care provider device 134, may render the data received from the edge device 20 into one or more graphical user interfaces. Additionally, the aspects of the supervisory application 44 that are saved on each care provider device may include various container, component, and presentation layers to receive the data from the edge device 20, populate the graphical user interfaces with the received data, send and receive messages, display notifications, collect GUI settings and other requested customizations (and send the settings/configurations to the edge device 20) and so forth. As an example, the historical data received form the edge device 20 (e.g., the trends) may be sent to a first layer via a REST application programming interface (API), the real-time medical device data may be streamed to the first layer via a web socket, and the push notifications sent from the MDD processing system 12 may be received, processed, and displayed via the visualization platform. Further, when interacting with the graphical user interfaces of the supervisory application, the user may adjust various settings (such as which patient monitoring parameters to display) activate or deactivate alarm notifications, create insights, and so forth. These user-specific preferences/configurations may be saved on the edge device 20 in a preferences/configuration database.

In some embodiments, medical device data and/or other information requested via the supervisory application 44 may be obtained from an electronic medical records (EMR) database 122. For example, historical data (e.g., trend lines) may be obtained from the EMR database 122 in addition to or instead of data storage 104. EMR database 122 may be an external database via a secured hospital interface, or EMR database 122 may be a local database (e.g., housed on a device of the hospital). EMR database 122 may be a database stored in a mass storage device configured to communicate with secure channels (e.g., HTTPS and TLS), and store data in encrypted form. Further, the EMR database 122 is configured to control access to patient electronic medical records such that only authorized healthcare providers may edit and access the electronic medical records. An EMR for a patient may include patient demographic information, family medical history, past medical history, lifestyle information, preexisting medical conditions, current medications, allergies, surgical history, past medical screenings and procedures, past hospitalizations and visits, etc.

The edge device 20 can be implemented in a variety of hardware and/or software implementations and it should be noted that such implementations are not considered to be limiting. For example, it is contemplated that any or all of the edge device 20 may be embodied exclusively in hardware, exclusively in software, exclusively in firmware, or in any combination of hardware, software, and/or firmware. The examples provided herein are not the only way to implement such methods and systems.

In exemplary and non-limiting embodiments of the edge device, the edge device 20 is implemented by one or more processors or computing devices. Memory and processors as referred to herein can be standalone or integrally constructed as part of various programmable devices, including for example, computers or servers. Computer memory of computer readable storage mediums as referenced herein may include volatile and non-volatile or removable and non-removable media for a storage of electronic-formatted information such as computer readable program instructions or modules of computer readable program instructions, data, etc. that may be stand-alone or as part of a computing device. Examples of computer memory may include, but are not limited to, RAM, ROM, EEPROM, flash memory, CD-ROM, DVD-ROM or other optical storage, magnetic cassettes, magnetic tape, magnetic disc, or other magnetic storage devices, or any other medium which can be used to store the desired electronic format of information and which can be accessed by the processor or processors or at least a portion of a computing device.

FIG. 2 shows an example single-patient graphical user interface (GUI) 200 that may be displayed when supervisory application 44 is launched on a supervising care provider device. Single-patient GUI 200 may be displayed on a display device 202. Display device 202 may include a screen on which the single-patient GUI is displayed and may be coupled to and/or included as a part of a computing device, such as care provider device 134. Single-patient GUI 200 may be displayed in response to a user request to display the GUI. For example, a user may launch the supervisory application 44 by selecting a supervisory application icon displayed on a home page of the display device. When the supervisory application 44 launches (at least initially), the user may be authenticated via a suitable authentication method, such as via a password, facial recognition, fingerprint recognition, etc. Upon authentication, the user may select to view the single-patient GUI 200 from a suitable menu. For example, the user may access a multi-patient interface that includes a global view of all patients the user has selected to monitor (which may include all patients at the medical facility the care provider is attending to) and may select a desired patient to view. For example, a multi-patient GUI may include links to patient-specific interfaces. In the examples shown herein, rather than identifying each patient by name or a patient ID number, each patient-specific interface may be identified by the room that patient is currently located in. For example, links may be displayed for interfaces specific to patients located in a first operating room (OR 1), a second operating room (OR 2), a third operating room (OR 3), and so forth. Additional patient links may be viewed by scrolling the interface. Selection of a patient link may launch the single-patient GUI for that patient.

Returning to FIG. 2, single-patient GUI 200 may include an identification header 204 that identifies the patient whose medical device data/status is being displayed, in the form of the room in which the patient is currently located. In the illustrated example, single-patient GUI 200 is specific to the patient located in the second operating room of the medical facility (OR 2). Identification header 204 may include a back button 206, which when selected via user input (e.g., via touch input to the back button) may cause display of a multi-patient GUI. Identification header 204 may further include one or more menu buttons, such as menu button 208. When menu button 208 is selected, a context menu may be displayed, which may include buttons that trigger displays of trends, insights, or other data visualizations or interactive controls.

Figure 3:
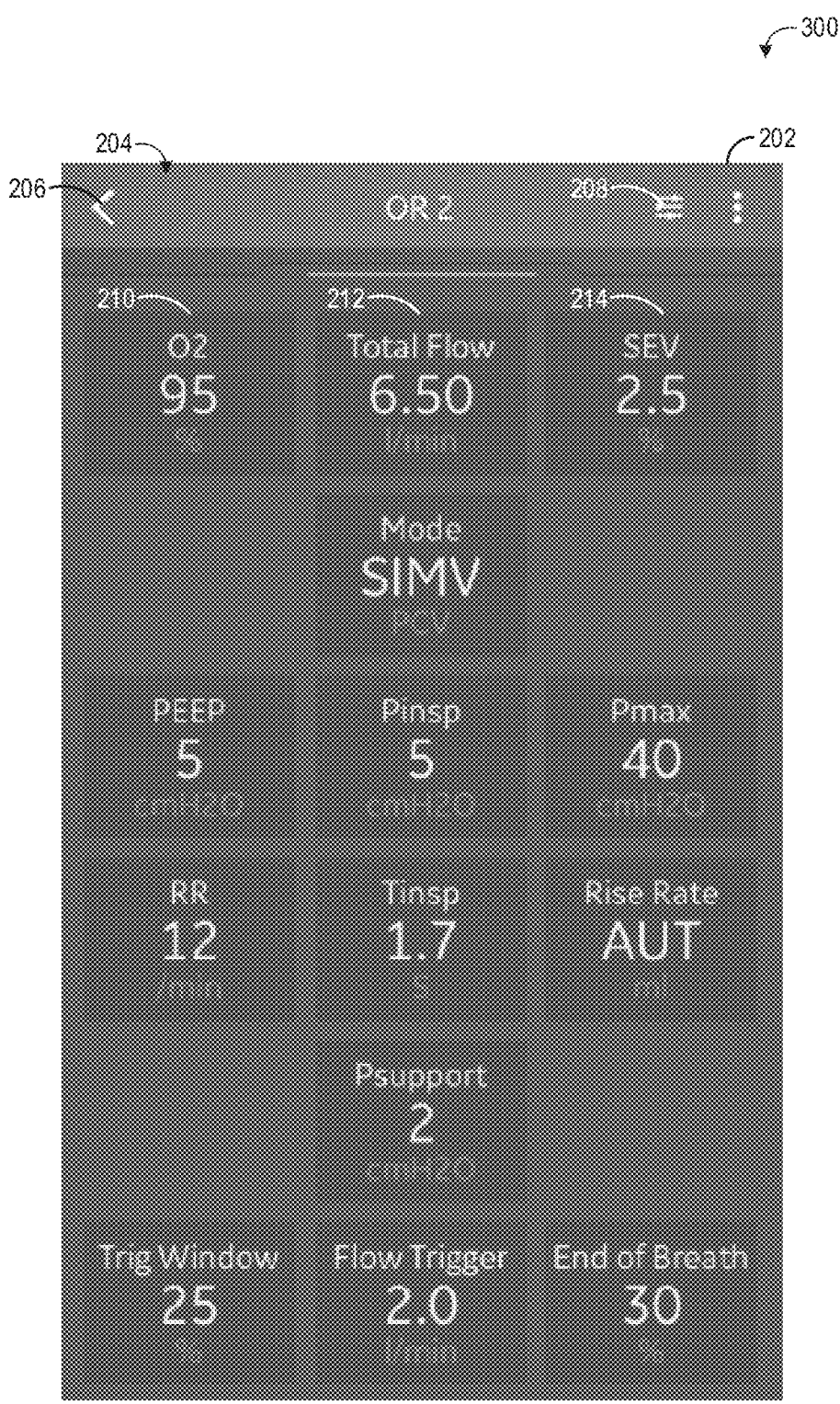

Identification header also includes a settings view button 210 that, when selected causes display of a settings view where machine settings/parameters for the one or more medical devices monitoring the patient and/or delivery therapy to the patient (such as machine settings for an anesthesia machine) are displayed. FIG. 3 shows an example settings view 300 displayed on display device 202 in response to selection of the settings view button 210. Settings view 300 displays machine settings in a first layout that includes an array of tiles. Each selected machine setting may be displayed as a respective tile, such as a first tile 210, a second tile 212, and a third tile 214. In the example shown in FIG. 3, the first tile 210 displays a first setting, oxygen percentage, the second tile 212 displays a second setting, oxygen or medical gas flow rate to the patient, and the third tile 214 displays a third setting, anesthetic agent type and concentration. Each settings tile that is displayed via the settings view 300 may present a most-recently determined value of the respective machine parameter. For example, the first tile 210 is presenting an oxygen concentration of 95%, the second tile 212 is presenting a gas flow rate of 6.50 L/min, and the third tile 214 is presenting a sevoflurane concentration of 2.5%. Each determined value that is presented via a machine settings tile may be determined from the time series streams of medical device data described above with respect to FIGS. 1A and 1B, and as such may be sent to the care provider device from the edge device 20 via the supervisory application 44. The determined values that are displayed in the settings view 300, as well as other determined values (such as the patient monitoring parameter values that will be explained in more detail below) may be measured values, estimated values, and/or inferred values. For example, SpO2 may be directly measured from a pulse oximeter, while respiration rate may be inferred from the output of a capnography or from the output form the pulse oximeter.

The patient monitoring parameter tiles included in the single-patient GUI 200 (described below) may present physiological data (e.g., SpO2, respiration rate) of the patient as obtained from one or more patient monitoring medical devices (e.g., a pulse oximeter, a capnograph). The machine settings tiles included in the single-patient GUI 200 and/or settings view 300 may present machine data of one or more life-critical medical devices that are being utilized during a medical procedure being performed on the patient, such as an anesthesia delivery machine. The machine data may include machine settings or parameters (e.g., ventilator mode, anesthesia type and concentration). As will be described in more detail below, changes to the settings for the anesthesia machine may be made or suggested via the supervisory application.

Returning to FIG. 2, single-patient GUI 200 further includes an insights tile 302, a message tile 304, an alarms tile 306, and a procedure timing tile 308. The insights tile 302 may notify the user if any of the user's preset and saved insights have been triggered. Briefly, the insights may be similar to threshold-based alarms, but may be multi-modal and/or multi-parameter such that an insight may only be triggered when more than one parameter meets a predetermined condition and/or when a selected parameter meets a predetermined condition during a particular stage of a medical procedure, meets the predetermined condition for a specified amount of time, changes at a specified rate, etc. The messages tile 304 may notify the user if any messages have been received, such as text messages from another care provider. The alarms tile 306 may notify the user if any alarms have been triggered. An alarm may be triggered when a select patient monitoring parameter, such as SpO2, reaches a predetermined condition relative to a threshold, such as SpO2 dropping below 90%. The procedure timing tile 308 may inform the user of the current progress on the medical procedure being performed on the patient. For example, as shown in FIG. 2, an amount of elapsed time since commencement of anesthesia delivery is shown (e.g., 02:12:15), as well as the current phase of the anesthesia delivery (e.g., maintenance phase). The phase of anesthesia delivery may be determined by a phase determining insight that may be executed by the MDD processing system 12 and/or edge device 20, as explained above with respect to FIGS. 1A and 1B.

Additional patient monitoring parameters that are displayable via single-patient GUI 200 may be organized into categories, and each patient monitoring category may be collapsed or expanded. When collapsed, no patient monitoring parameters for that category are displayed. When expanded, the patient monitoring parameters for that category are displayed. FIG. 2 shows each category in a collapsed configuration. The patient monitoring categories shown in FIG. 2 include a circulation category 310, an oxygenation category 312, a ventilation category 314, and a neurology category 316, although other categories are possible without departing from the scope of this disclosure. The displayed patient monitoring categories may be customized by the user, such that the user may select which categories will be displayed on that user's device. Each patient monitoring category includes a forward arrow, such as forward arrow 318, which when selected by the user causes the category to expand so that the patient monitoring parameters in that category may be viewed.

FIG. 4 shows a view 400 of single-patient GUI 200. In the view 400, the user has selected two categories to expand (the circulation category 310 and the oxygenation category 312) and two categories remain collapsed (the ventilation category 314 and the neurology category 316). When a category is expanded, the associated forward arrow may switch to a down arrow, as shown by down arrow 402, to signify that the category has been expanded. User selection of the down arrow causes the category to collapse.

As appreciated by FIG. 4, when a category is expanded, a plurality of patient monitoring parameters may be displayed. For example, the circulation category 310 includes eight patient monitoring parameters (e.g., an ECG waveform, a most-recently determined heart rate, and so forth) each related to circulation. The oxygenation category 312 includes six patient monitoring parameters (e.g., a most-recently determined SpO2), each related to oxygenation. The patient monitoring parameters that are included in each category may be selected by the user via an edit function, which may be executed via the context menu or by a user input made to a category. For example, a swipe motion on the circulation category 310 banner may trigger display of an edit button. Selection of the edit button may trigger control buttons to be displayed, via which patient monitoring parameters in the category may be deleted and/or additional patient monitoring parameters may be added. In this way, the edit/customization functionality gives the power to the user to view any parameter in the system using the single-patient GUI, including a trend of that parameter, within a tile. For example, via the edit function, the user may choose to view a patient monitoring parameter as a single value (e.g., most recently determined value), as a trend showing change in the patient monitoring parameter over time, or both. The user has the power to create their own views, their own insights, and so forth.

As explained above, one or more of the patient monitoring parameters that are displayed in the expanded view of a category may include a most-recently determined value for that parameter. For example, in the oxygenation category 312, a SpO2 tile 404 may be displayed, showing the most-recently obtained SpO2 value. However, it may be beneficial for the user to view a change in the values of a patient monitoring parameter over time. To access a view where one or more patient monitoring parameter trends are displayed, the user may enter an input to a selected patient monitoring parameter tile, such as a single touch input (schematically shown by hand 406) to SpO2 tile 404. Selection of the patient monitoring parameter tile may trigger a trend view for the selected patient monitoring parameter, where trend data for additional parameters may be displayed with optional movable timelines for visualizing parameter values across trends at any given moment in time, over various ranges, with different orientations and layout options that may be customized as described below.

The supervisory application 44 supports further customization options via the menu triggered by menu button 208, including single or multi-patient views, customized insight views, default and customized layouts, and edit room views where customizable tile layouts can be created to visualize patient data for a plurality of patients. In addition to visualizations of patient data, the supervisory application may support the inclusion of customizable alarms, reminders, or notifications; messaging between two or more users of the supervisory application (e.g., a supervisor and an attending clinician) via text, voice, or audio recordings, including the ability to send screenshots or other images; the ability to attach notes to patient displays or records; displays of status indications regarding what stage of a given process a patient is currently in; and the ability to either directly change settings on various machines or devices remotely, or make requests/suggestions of settings changes to attending clinicians. As an example, the administration of anesthesia to patients represents one specific area where the supervisory application described above can be used to improve patient care. Communication between the attending clinician(s) and supervising clinician may be complicated if the supervising clinician lacks firsthand information, if technological and/or distance constraints are present, and the fact that the supervisor may be overseeing a plurality of rooms/clinicians simultaneously. As non-operating room anesthesia (NORA) continues to surpass the use of anesthesia in traditional operating theaters and care moves further from the traditional operating room environment, and especially within the context of increasing use of supervisory models, there is a growing need to support remote anesthesia care.

The supervisory application described above may allow a clinician (e.g., a supervisory anesthesiologist) to remotely monitor one or more patients at any given moment by providing real-time medical device data on demand, in a variety of user-customizable formats. The real-time medical device data may include current therapy machine (e.g., anesthesia machine) settings, such as oxygen flow, anesthesia concentration, and so forth. In some cases, it may be beneficial for the clinician to request changes to the anesthesia machine settings when located outside the room in which the anesthesia machine is located.

Circumstances may also arise in which an attending clinician at the point of care may need to monitor or control the administration of anesthesia from outside the room. For example, in NORA cases anesthesia machines may be co-located with X-Ray machines, which would require an attending clinician to temporarily leave the room to avoid exposure to radiation. In such situations, monitoring of anesthesia settings and patient responses would ordinarily have to be temporarily suspended, exposing the patient to a higher level of risk in the event of an unexpected reaction, machine degradation, or other contingency while the clinician was away from the anesthesia machine. Other circumstances may include unforeseen clinician shortages, accidents, or absences, highly contagious or abusive patients, temporary workplace hazards, or any other circumstances in which it is impossible, unfeasible, impractical, or undesirable for an attending clinician to be physically present with a patient.

Embodiments of a system for temporarily transferring control of an anesthesia machine to a remote device are presented below in FIGS. 5-18. The system may include an anesthesia machine, a remote device such as care provider device 134, and a dedicated anesthesia access server for managing authentication vis-à-vis a legacy hospital authentication service, as described below and shown in FIGS. 5-12. In the case of an attending clinician not being able operate the anesthesia machine directly, remote access may entail directly changing the settings on the anesthesia machine via controls provided in a GUI displayed on a remote device, as described below and shown in FIG. 13. In the case of a supervisory anesthesiologist monitoring one or more attending clinicians, remote access may include sending a notification to an attending clinician requesting a settings change, which may be displayed on an anesthesia machine as described below and shown in FIGS. 14-17.

Since security breaches have the potential to cause patient care issues such disrupting ordered/commanded treatments, remote access may be managed via an authentication procedure. Currently most of the security involves authentication at the network layer and organizational level (e.g. LDAP). Since network layer security and organization level authentication mechanisms may not be sufficient to provide the necessary level of security, additional mechanisms may be desired to ensure that remote operators of anesthesia machines are properly authorized, identified, and tracked in accordance with hospital policies and best practices. Additionally, for security purposes and in order to ensure that an attending clinician may change anesthesia machine settings at the point of care, authentication of remote access may only be initiated via direct interaction with the anesthesia machine and not by the remote device.

Figure 5:
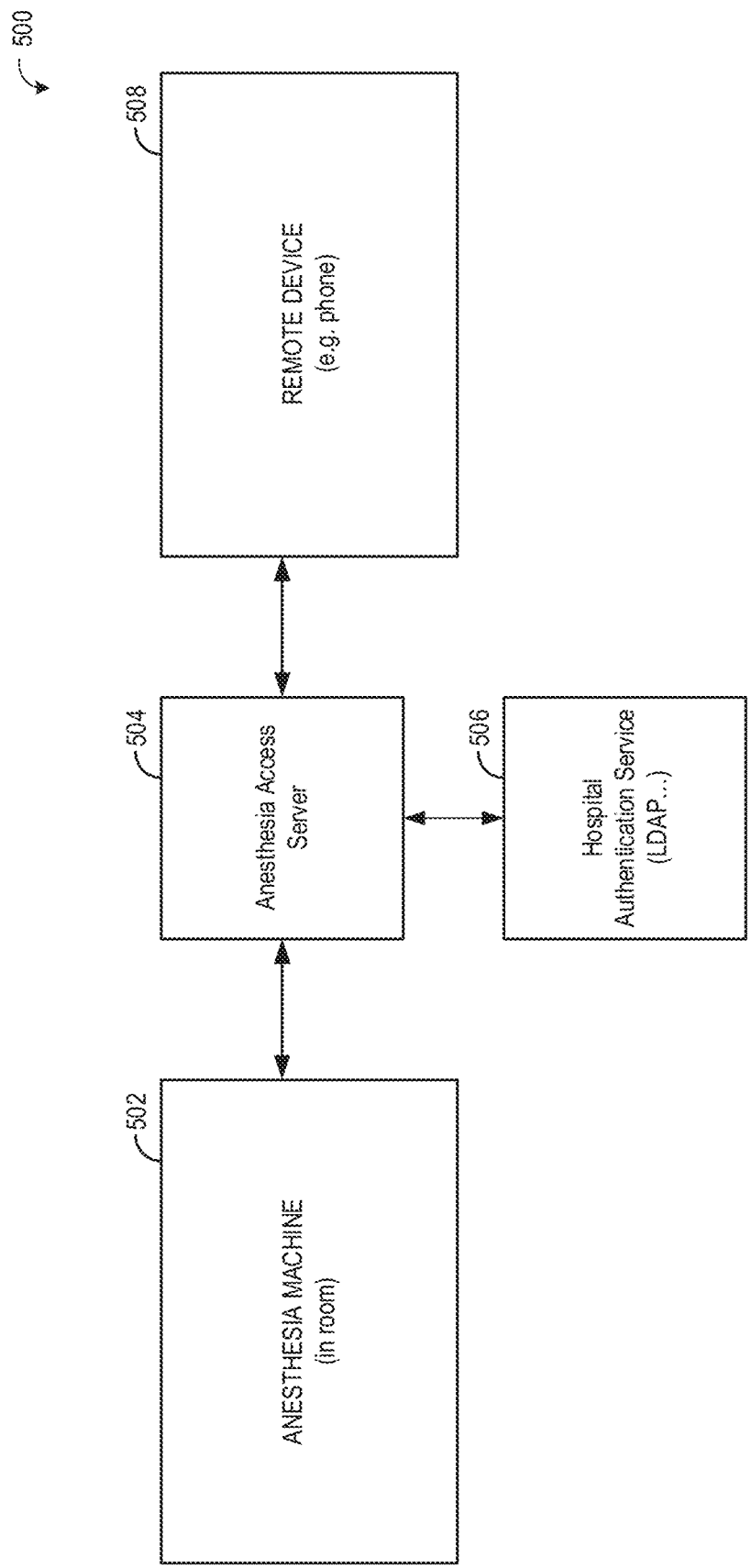
FIG. 5 schematically shows an example system for authentication of a remote device configured to remotely control a life-critical medical device.

FIG. 5 schematically shows an example system 500 for managing authentication via a dedicated anesthesia access server 504, which validates users against a hospital authentication service 506. The access server 504 manages the handoff between an anesthesia machine 502 and a remote device 508 (e.g., a smart phone, such as care provider device 134). It should be appreciated that anesthesia machine 502 is a non-limiting example of one of the patient therapy devices 16b of FIG. 1A. The procedure used for authentication in accordance with example system 500 is initiated via user interaction with the graphical user interface of the anesthesia machine described below and shown in FIG. 6.

The anesthesia access server 504 and the hospital authentication service 506 can be implemented in a variety of hardware and/or software implementations and it should be noted that such implementations are not considered to be limiting. For example, it is contemplated that any or all of the anesthesia access server 504 and the hospital authentication service 506 may be embodied exclusively in hardware, exclusively in software, exclusively in firmware or in any combination of hardware, software, and/or firmware. While the following describes exemplary methods and systems, the examples provided herein are not the only way to implement such methods and systems.

In an embodiment, the anesthesia access server 504 and the hospital authentication service 506 may each be hosted on hospital computing infrastructure such as physical servers that include a communication module, memory, and processor(s) to store and execute aspects of the anesthesia access server 504 and the hospital authentication service 506, similar to the servers explained above with respect to FIG. 1A. For example, a server or system may include a computer processor, controller, or other logic-based device that performs operations based on instructions stored on a tangible and non-transitory computer readable storage medium, such as a computer memory.

In exemplary and non-limiting embodiments, anesthesia access server 504 and the hospital authentication service 506 may be implemented by one or more networked processors or computing devices, including a cloud computing platform and/or infrastructure.

The anesthesia access server 504 and the hospital authentication service 506 may be accessed on at least one hospital network, for example, hospital network 14. The hospital network may include, but is not limited to, a wide area network (WAN); a local area network (LAN); the internet; wired or wireless (e.g. optical, Bluetooth, radio frequency (RF) network; a cloud-based computer infrastructure of computers, routers, servers, gateways, etc.; or any combination thereof associated therewith that allows the system or portions thereof to communicate with one or more computing devices. The hospital authentication service 506 may use the Lightweight Directory Access Protocol (LDAP) to provide access to user credentials over a hospital network.

It should be appreciated that while some embodiments and implementations of the hospital authentication service 506 and the anesthesia access service 504 may seek to operate within a single hospital or unit of a hospital, the hospital authentication service 506 and the anesthesia access service 504 may be hosted outside the hospital and/or their scope may include a plurality of hospitals or patient care centers, including hospitals currently owned or operated or otherwise affiliated with one another. In still further embodiments, while individual hospitals or groups of hospitals may use the hospital authentication service 506 and the anesthesia access service 504, use the hospital authentication service 506 and the anesthesia access service 504 may receive and process information from a plurality of hospital networks including those unaffiliated with one another at the same time.

Figure 6:
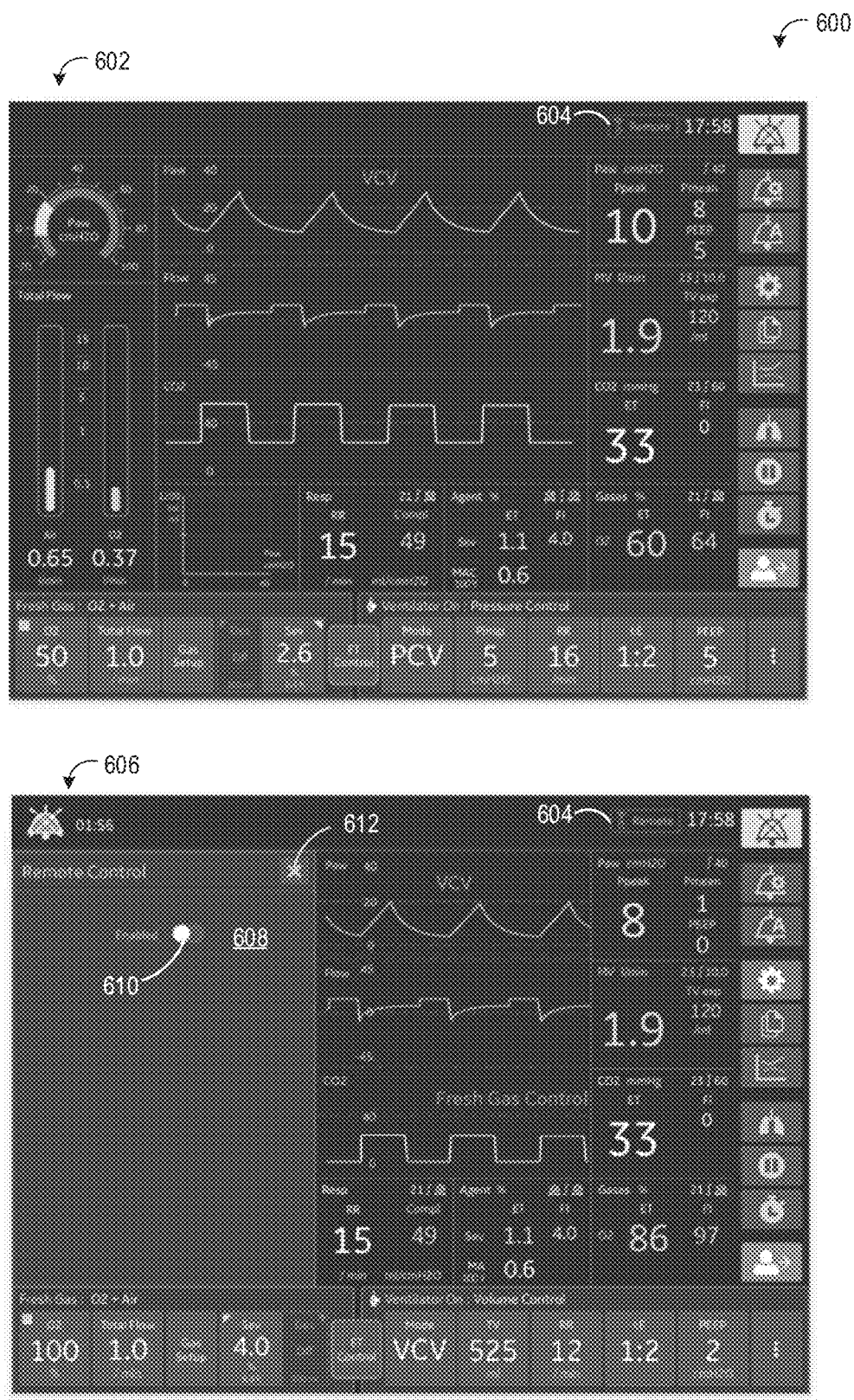
FIGS. 6 and 18 show example views of graphical user interfaces displayed on a life-critical medical device, herein an anesthesia machine.

FIG. 6 shows two example views of a graphical user interface displayed on an anesthesia machine. GUI 602 shows a graphical user interface as seen by an operator (e.g., attending clinician) while monitoring a patient at the point of care. Various machine settings are displayed via a collection of display elements, including but not limited to a dial (airway pressure) and gauge (total flow of air and $O_2$) on the left side; trend lines and parameters for airway pressure, flow, and $CO_2$ in the center of the GUI, additional parameters displayed in tiles in the bottom third of the GUI, and functional menu buttons (tiles) along the right side. In some embodiments, display elements may include interactive control elements that permit an operator to change parameter settings by selecting (e.g., clicking or touching) directly on display elements in GUI 602.

GUIs 602 and 606 include display element 604, which is a control element (e.g., a button) that when selected opens remote control panel 608 shown on the left side of GUI 606, partially obscuring GUI 602, within which display or control elements relevant to enabling remote control may be presented. Remote control panel 608 may include control element 610 (e.g., a slider) which allows a user to send a request to initiate the procedure for transferring control of the anesthesia machine to a remote device. Display element 604 and 610 are shown for illustrative purposes as a button and a slider, respectively, but may comprise any interactive element (button, slider, radio button, checkbox, etc.).

Figure 10:
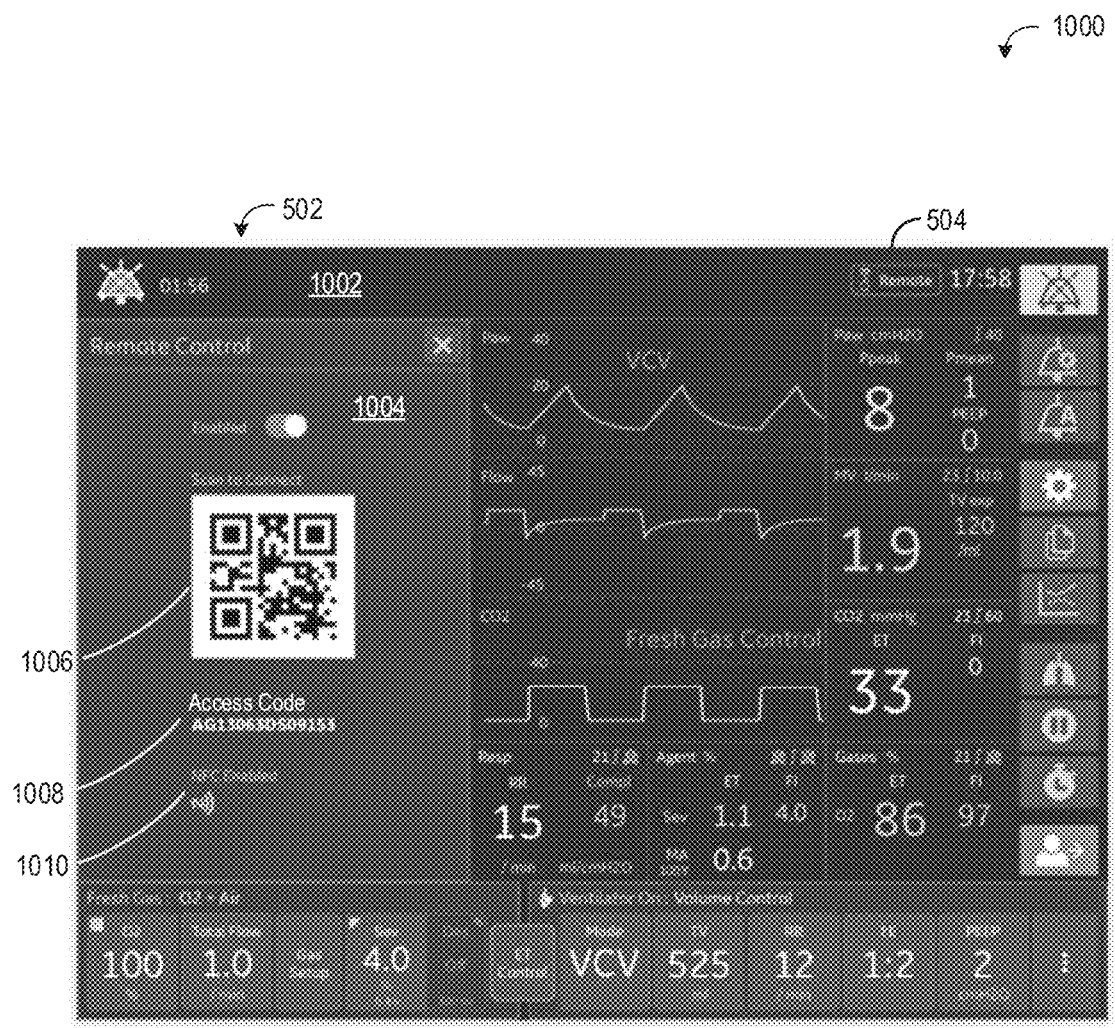
FIG. 10 shows an example view of a graphical user interface displayed by a life-critical medical device located at a point of care.
Figure 11:
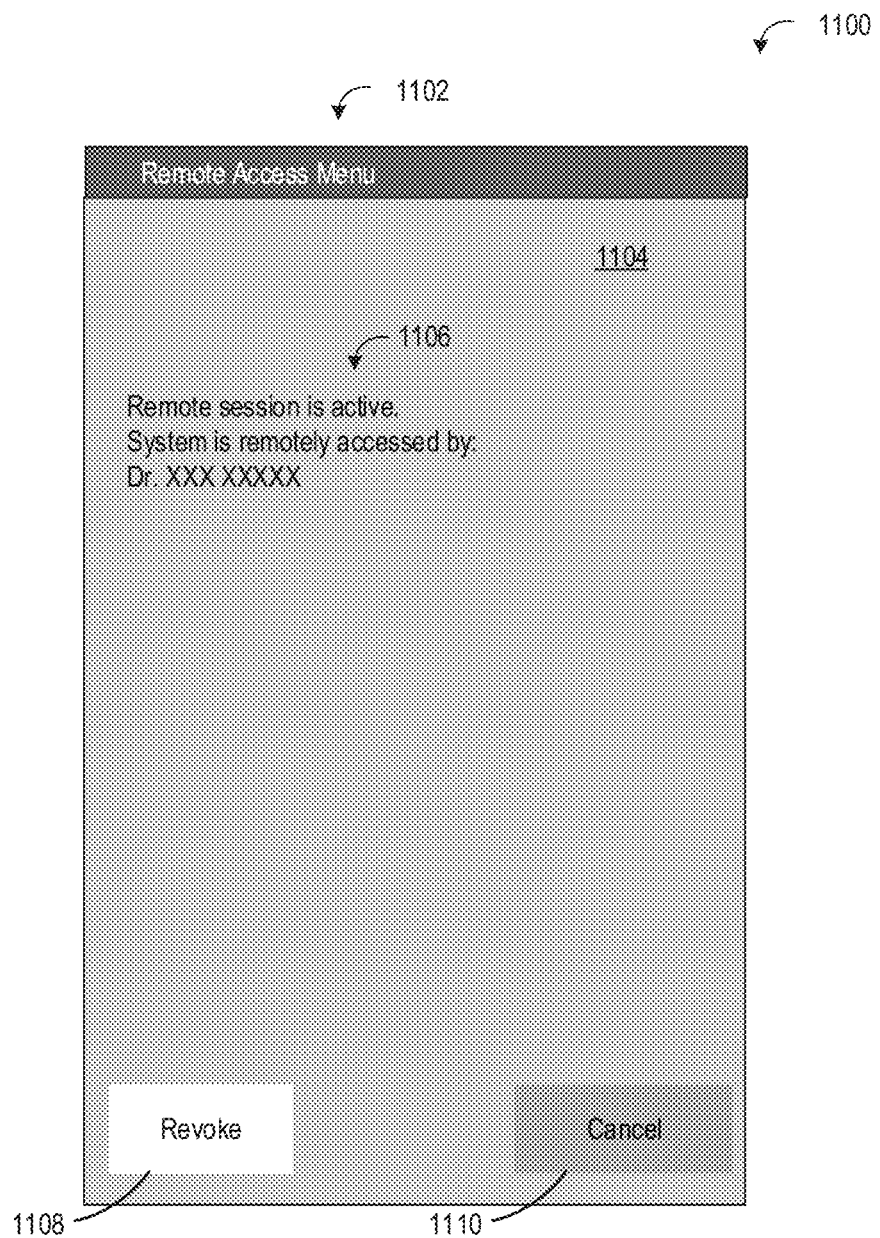
FIG. 11 shows example views of a graphical user interface displayed within a GUI for a life-critical medical device showing a notification indicating that a remote session has been activated.

Additional display elements may be included on the remote control panel, such as access code information displayed during the authentication process as shown in FIG. 10, or a notification that control of the anesthesia machine has been ceded to a remote device as shown in FIG. 11, and/or other information such as to whom control was ceded, the amount of time elapsed since control was ceded, contact information, and the like.

In addition to display elements, control elements such as buttons may be provided to revoke the remote session and return control to the anesthesia machine, as indicated in FIG. 11. Since an attending clinician is ultimately responsible for patient care, remote sessions may be both initiated and revoked in person at the machine, thus ensuring that an attending clinician is physically present when control is ceded and returned to the anesthesia machine. When a remote session is revoked, the remote control panel will disappear from the anesthesia machine GUI, leaving the GUI as shown in 602. A cancel button may also be displayed that closes the remote control panel and removes the remote panel from view, permitting an operator to see the full GUI shown in 602. The same functionality may be provided via a window closure element such as an X in the upper right corner of the panel, as shown in 612. It should be appreciated that remote control of the anesthesia machine may not revoked upon closing the remote control panel on the anesthesia machine, at least in some examples.

Figure 18:
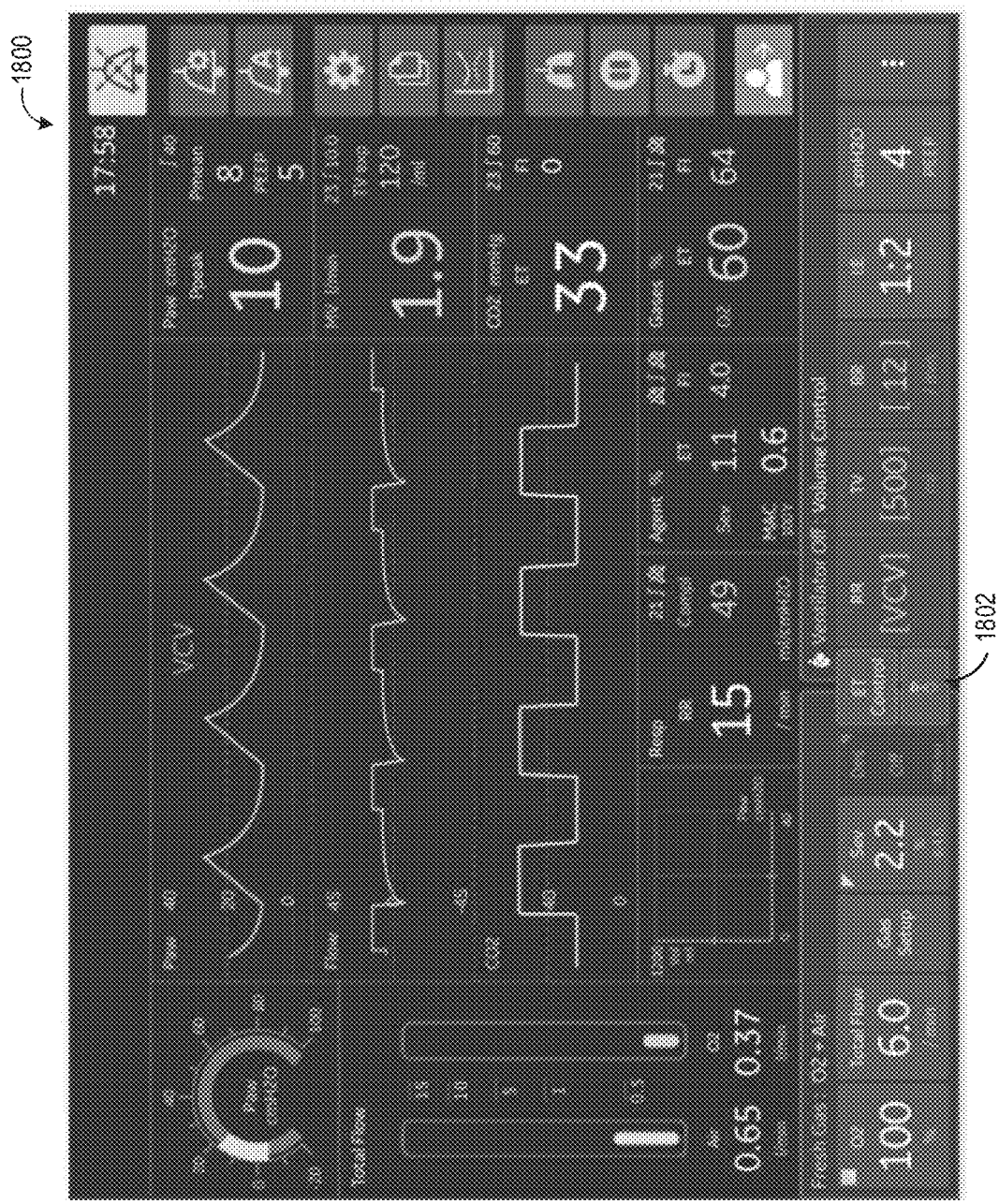

FIG. 6 shows a first embodiment of a GUI that may be configured for invoking remote control of an anesthesia delivery machine. A second embodiment of a GUI configured for invoking remote control of an anesthesia delivery machine is shown in FIG. 18. GUI 1800 of FIG. 18 may be displayed on a display device/screen of an anesthesia machine, as explained above with respect to FIG. 6, and may include similar control elements, displayed machine settings, etc., as described above. GUI 1800 may lack the display element 604 and may instead include a remote control button 1802 positioned along the bottom of the GUI 1800. The remote control button 1802 may include an icon signifying remote control (e.g., signifying a wireless connection) or have another suitable visual appearance.

Figure 7:
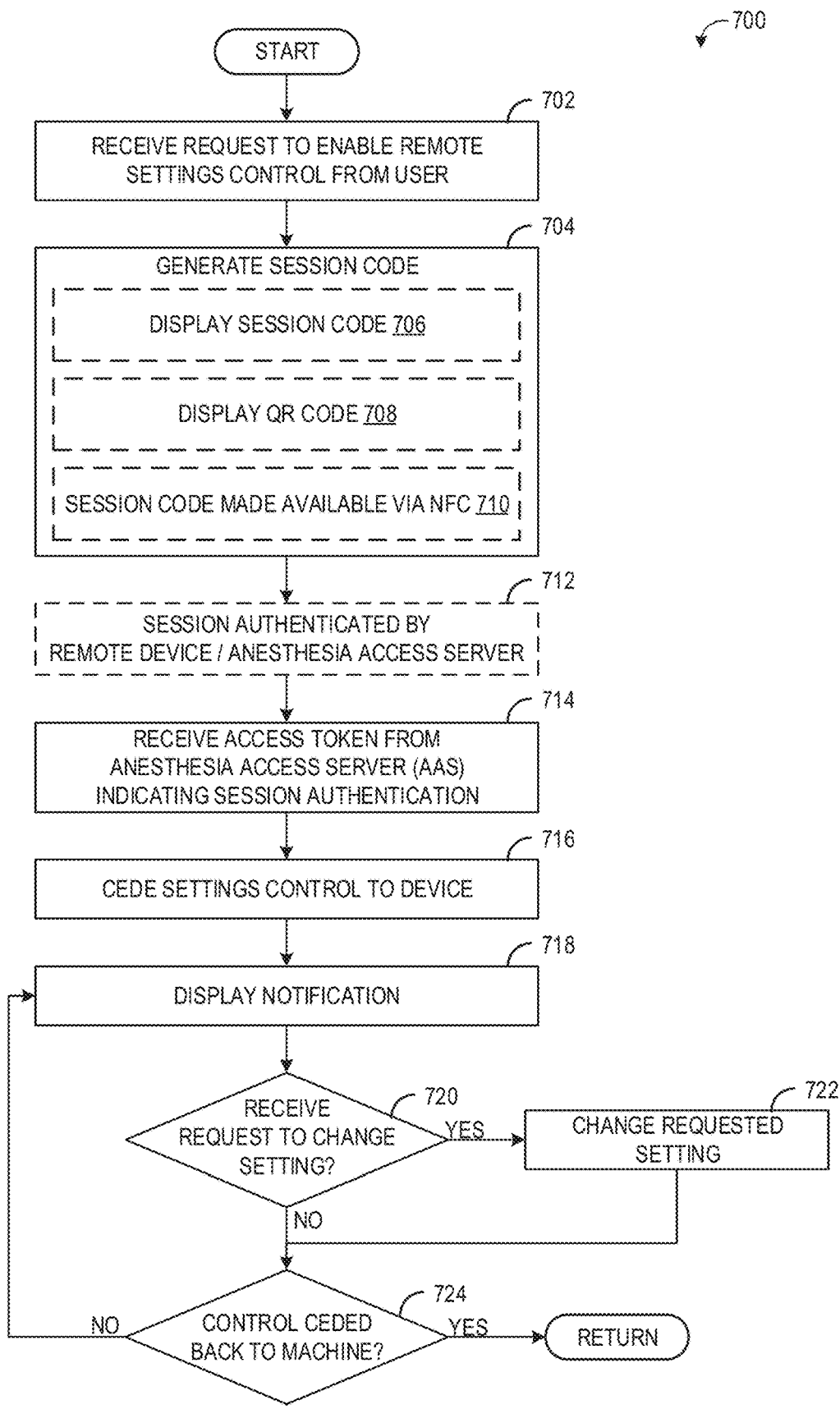
FIGS. 7-9 are flow charts illustrating example methods for authentication of a remote device used to change settings on a life-critical medical device from the perspective of the life-critical medical device, a remote device, and a dedicated access server, respectively.
Figure 8:
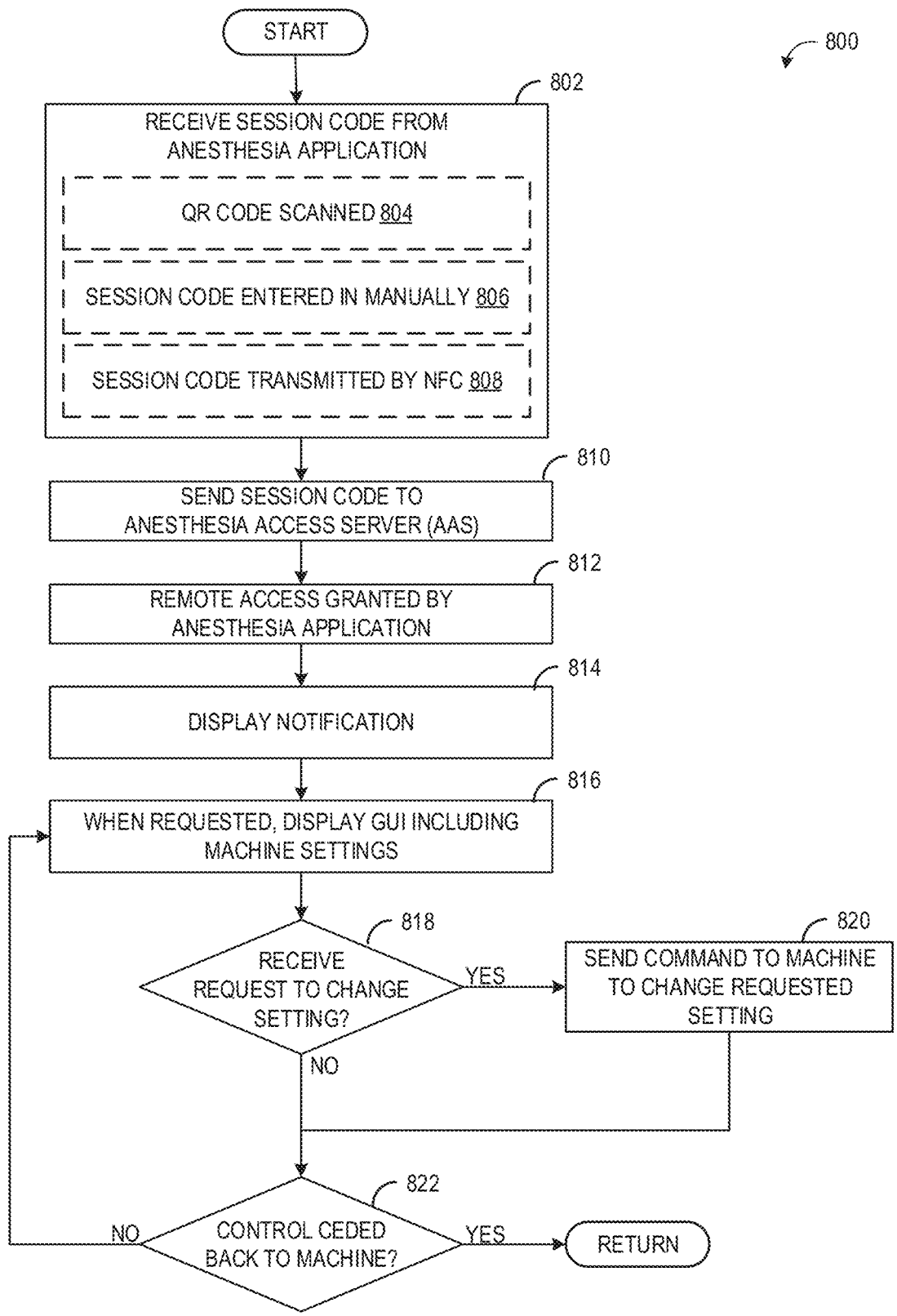
Figure 9:
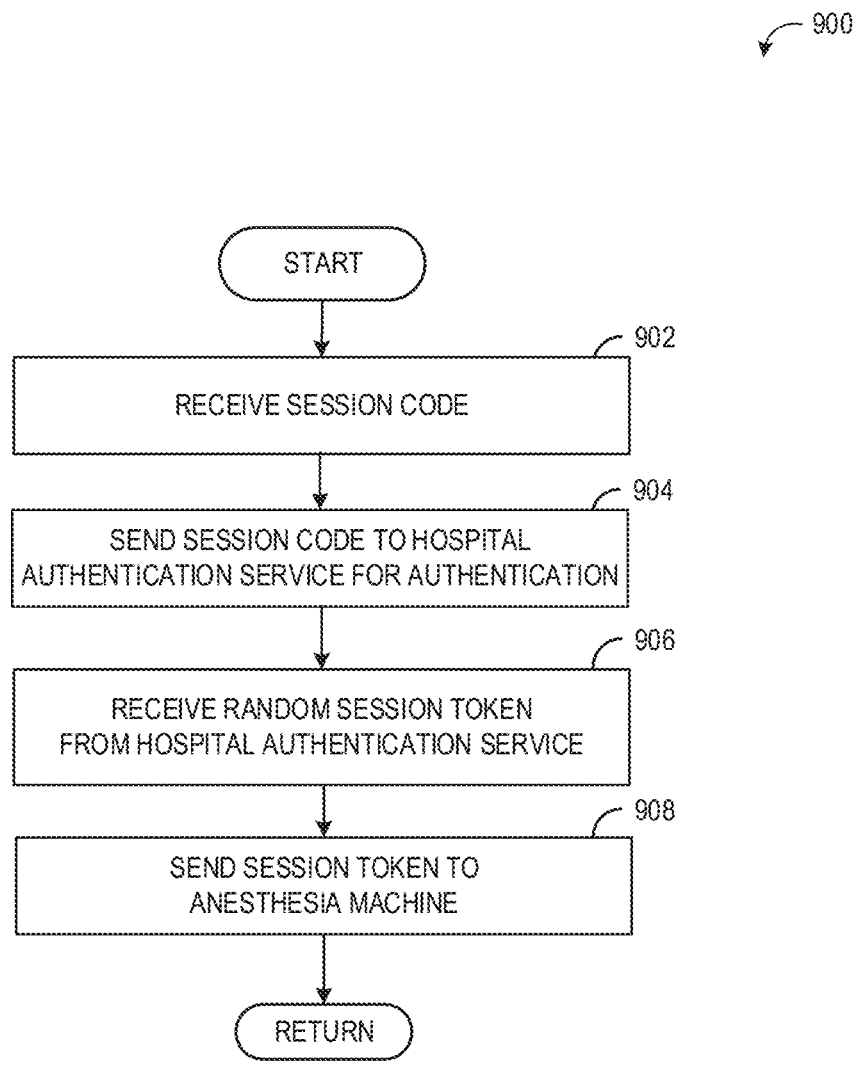

Moving on, FIGS. 7, 8, and 9 show flowcharts illustrating example methods for requesting and establishing remote control of an anesthesia machine by a remote device (e.g., a smart phone, such as care provider device 134) from an anesthesia machine perspective, a remote device perspective, and an anesthesia access server perspective, respectively. FIGS. 7-9 are described with regard to the systems and components of FIGS. 1A, 1B, and 6, though it should be appreciated that the methods may be implemented with other systems and components without departing from the scope of the present disclosure.

FIG. 7 shows a method 700 for establishing remote control of the anesthesia machine from the anesthesia machine perspective. Method 700 may be executed according to instructions stored in non-transitory memory of an anesthesia machine, such as anesthesia machine 502 of FIG. 5. At 702, a request is received from a user (e.g., attending clinician) to enable remote control of the anesthesia machine by a remote device. For example, the user may select a remote button on a graphical user interface displayed on a display device of the anesthesia machine (e.g., button 604 of FIG. 6 or button 1802 of FIG. 18), or enter another suitable user input. At 704, a session code is generated by the anesthesia machine. The session code may be a unique code (for example, a number) used to uniquely identify an interactive temporary information exchange between two or more communicating devices on a network. For example, the anesthesia machine may generate a session code via a random number generator. The session code may not be available to a hospital computer network (such as hospital network 14), in order to prevent the session code from being accessed inappropriately by individuals or elements outside the system which could constitute a breach of security and could allow an unauthorized user to take control of the anesthesia machine.

Figure 12:
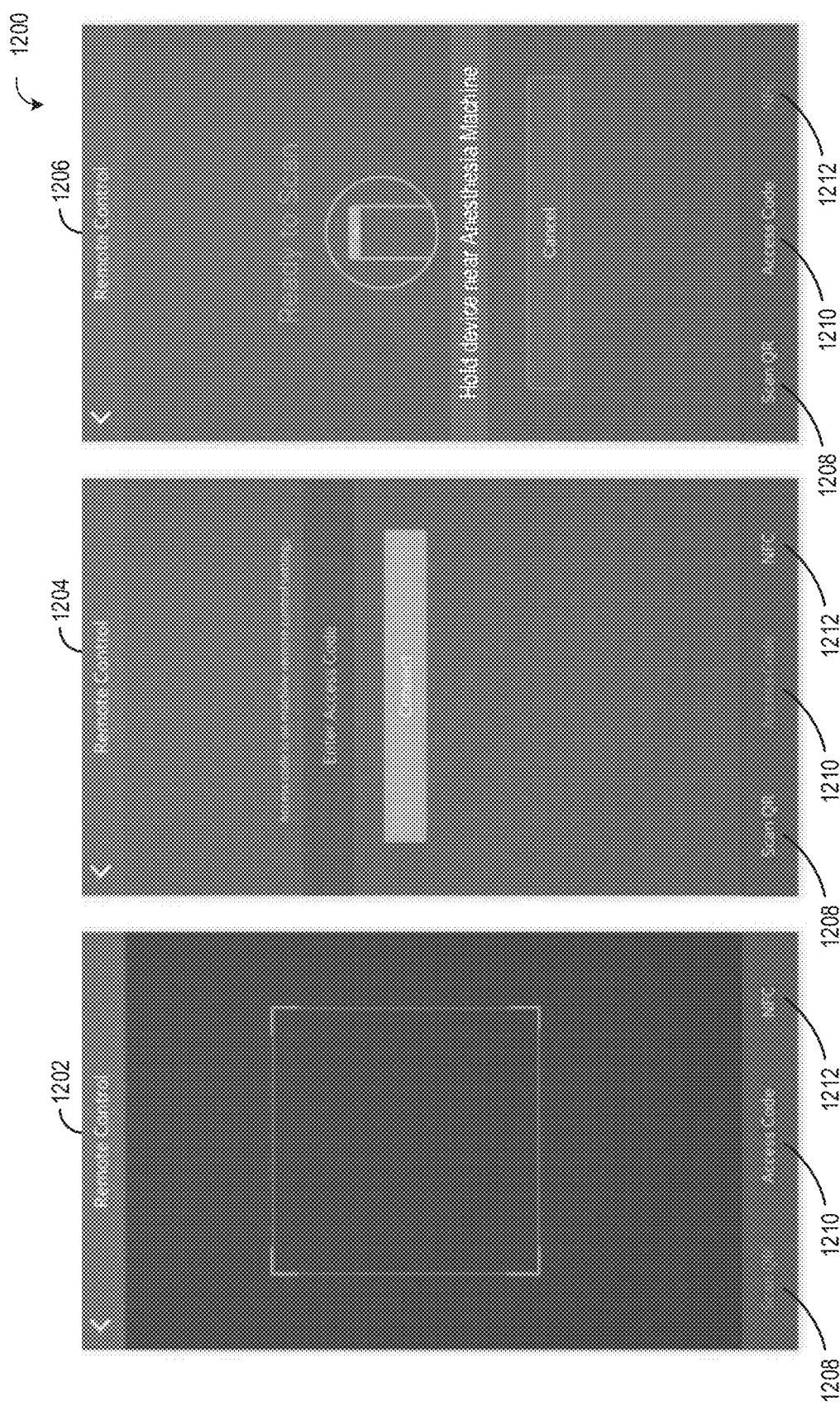
FIG. 12 shows example views of different modalities for obtaining a session/access code in order to authenticate a remote session via a graphical user interface displayed on a remote device.

Note that when discussing remote devices and in remote device GUIs, the expression "access code" may be substituted for "session code" for reasons of common usage and communicability, as seen in GUI 1204 in FIG. 12. The expressions "access code" and "session code" are used synonymously herein.

The session code may be transmitted to a remote device such as care provider device 134 in one or more modalities. For example, the session code may be displayed textually on the GUI of the anesthesia machine, such as in the remote control panel 608 of anesthesia machine GUI 606, to be manually entered into the remote device, or displayed via a QR code to be scanned in by the remote device, or displayed via another modality. The remote control panel 608 may also display an indication that a session has been made available to a remote device via Near Field Communication (NFC). An example illustrating session/access code display alternatives is seen in FIG. 10.

Returning to FIG. 7, once the session code has been successfully transmitted to a remote device as described above, at 712 a mobile application on the remote device may send the session code to an anesthesia access server, such as anesthesia access server 504, for authentication. Once the authentication process successfully terminates, as described in more detail in method 900, the anesthesia access server may send a session token to the anesthesia machine at 714 indicating that the session has been authorized. In that case, the anesthesia machine proceeds to cede control to the remote device at 716, and at 718, may display a notification on the anesthesia machine GUI that control has been ceded to a remote device as shown in FIG. 11. Once control has been successfully transferred to the remote device, at 720 the anesthesia machine determines if a request for a settings change from the remote device that has been granted remote control of the anesthesia machine has been received. If a request is received, method 700 proceeds to 722, where the anesthesia machine changes the requested setting. For example, the clinician operating the remote device may receive an alert (e.g. via the supervisory application executing on the remote device) that a monitored parameter of the patient connected to the anesthesia machine has changed (e.g., SpO2 has dropped by 5%). In response, the clinician may enter an input via the remote device (as will be explained in more detail below) requesting that the O2 flow of the anesthesia machine be increased. The anesthesia machine may receive the request and may automatically (e.g., without additional explicit human interaction) increase the O2 flow of the anesthesia machine. If a request is not received (or once the settings change is made), method 700 proceeds to 724 to determine if control of the anesthesia machine has been ceded back to the anesthesia machine. Control may be ceded back to the anesthesia machine via user input/command at the anesthesia machine, such as user selection of a control element in the anesthesia machine GUI such as the revoke button 1108 in FIG. 11. If control has not been ceded back to the anesthesia machine, method 700 returns to 718 and/or 720 to continue to process settings change requests as described above. If control is ceded back to the anesthesia machine at 724, the method returns. In some examples, once control of the anesthesia machine has been ceded to the remote device, adjustments to the anesthesia machine settings may not be made via the anesthesia machine itself (e.g., via GUI 602) unless the remote control is revoked at the anesthesia machine.

Further, in some examples, the anesthesia machine may monitor the connection between the anesthesia machine and the remote device when control has been ceded to the remote device. If the connection is lost (e.g., the remote device is moved to a location with weak/no WiFi and/or cellular coverage), the anesthesia machine may detect that the connection has been lost or is too weak to sustain control of the anesthesia machine by the remote device. The anesthesia machine may then notify any local users via a visual and/or audible notification output on the anesthesia machine and/or may attempt to notify the operator of the remote device via a notification system that may be configured to send notifications to the remote device via more than connection (e.g., the connection between the remote device and the anesthesia machine may be over a wireless hospital network, but the notification system may be configured to communicate with the remote device via a cellular network). In some examples, if the lost connection is transient (e.g., a connection is re-established within a threshold amount of time, such as 5-30 seconds after initially losing connection), once the connection is re-established, the prior remote control of the anesthesia machine by the remote device may be maintained.

Thus, method 700 of FIG. 7 provides for transferring control of an anesthesia machine to a remote device, via an authentication process governed by an anesthesia access server to ensure security. As stated above, remote control of an anesthesia machine is desirable when an attending clinician has to leave the anesthesia machine temporarily while monitoring a patient. Method 700 provides for securely ceding control to the remote device by demanding that the remote device/user of the remote device be located at the anesthesia machine in order to authenticate the user/remote device, e.g., via a session code displayed on the anesthesia machine that may be entered on the remote device manually by the user or scanned via a QR code, or received at the remote device from the anesthesia machine via NFC. Turning now to FIGS. 8 and 9 below, methods 800 and 900 reflect alternate views of the same procedure from the perspective of the remote device and the anesthesia access server, respectively.

In FIG. 8, method 800 shows the same process from the perspective of a remote device. Method 800 may be carried out according to instructions stored in non-transitory memory of a remote device configured to communicate with an anesthesia machine, such as remote device 508 of FIG. 5 and/or care provider device 134 of FIG. 1B. At 802, the remote device receives the session code from the anesthesia machine. As described above, the remote device may receive the code by scanning in a QR code, as indicated at 804, via manual entry of the code to the device, as indicated at 806, or via NFC, as indicated at 808. At 810, the remote device sends the session code to an anesthesia access server (AAS), such as AAS 504 of FIG. 5, for authentication.

Figure 13:
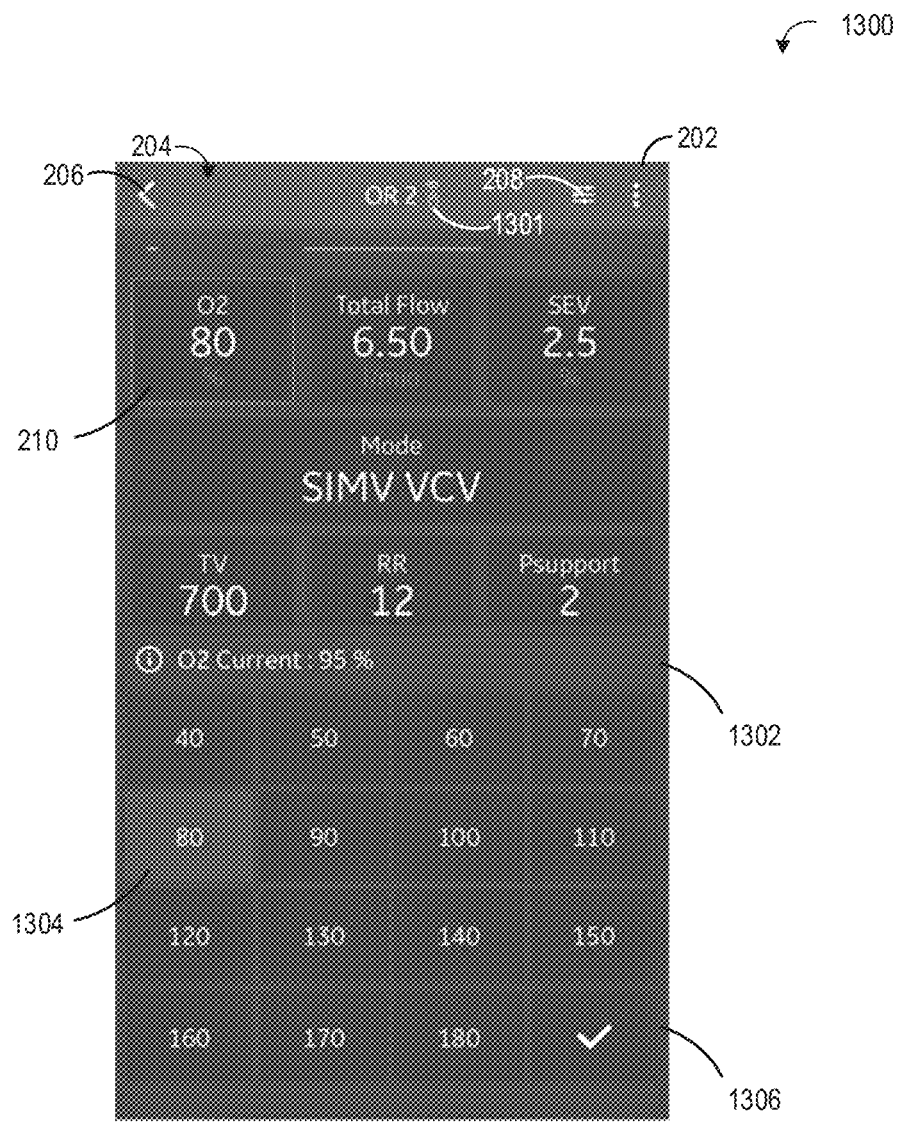
FIG. 13 is an example view of a graphical user interface displayed on a remote device in which a parameter setting in an in-room life-critical medical device can be adjusted.

Once the anesthesia access server successfully authenticates the session code (as shown in FIG. 9), the anesthesia machine cedes remote control of the anesthesia machine to the remote device at 812. The remote device proceeds to display a notification at 814 (e.g., on a display device associated with the remote device) indicating to the user of the remote device that remote control has been ceded. At 816, the remote device displays a GUI with anesthesia machine settings when requested, so that a user can select a setting to be changed. For example, an interactive tiled layout may be used wherein one or more settings tiles may indicate specific anesthesia machine settings. For example, as explained above, FIG. 3 shows an example of a GUI that may be displayed on a remote device when control of an anesthesia machine has been ceded to the remote device, including a plurality of settings tiles (e.g., a tile showing a set O2 concentration). Each settings tile may trigger, upon user selection of that tile, the display of a plurality of interactive settings values tiles, each settings value tile indicating a different setting/value option, such as the plurality of different O2 concentration tiles shown in the example GUI of FIG. 13 and explained in more detail below. The settings for any selected parameter may be changed by selecting the relevant settings tile and performing a confirmation action (e.g., pressing a button). An example of such a tiled layout is shown in FIG. 13 and discussed below.

At 818, method 800 determines if a request to change an anesthesia machine setting has been received from the user. In the above example, the request may be triggered on the remote device when a user selects a setting value tile indicating the desired value for a given setting and presses a button to confirm the settings change. If such a request is received, method 800 proceeds to 820 to send a command to the anesthesia machine to change the setting. If a request to change an anesthesia machine setting is not received, method 800 proceeds to 822 to determine if control of the anesthesia machine has been ceded back to the anesthesia machine. If control has not been ceded back to the anesthesia machine, method 800 returns to 816 to continue to wait for any further settings change requests. Alternatively, if control has been ceded back to the anesthesia machine, method 800 returns.

As with methods 700 and 800, method 900 of FIG. 9 similarly provides for transferring control of an anesthesia machine to a remote device via an authentication process governed by an anesthesia access server. Method 900 shows the authentication process from the anesthesia access server perspective. Method 900 may be executed according to instructions stored in non-transitory memory of an anesthesia access server, such as anesthesia access server 504 of FIG. 5.

At 902, an anesthesia access server such as anesthesia access server 504 receives a session code generated by the anesthesia machine via a remote device. The anesthesia access server proceeds to send the session code to a hospital authentication service such as hospital authentication service 506 for authentication at 904. At 906, the anesthesia access server receives a session token from the hospital authentication service indicating that the remote session has been successfully authenticated. The anesthesia access server then proceeds to send the session token to the anesthesia machine at 908 so that the anesthesia machine can cede remote control to the remote device, upon which the method returns.

Thus, methods 700, 800, and 900 provide different perspectives of a procedure whereby control of an anesthesia machine such as anesthesia machine 502 of FIG. 5 may be ceded to a remote device such as remote device 508 of FIG. 5, via an anesthesia access server such as anesthesia access server 504 of FIG. 5. The procedure described above in methods 700-900 is carried out by a user (e.g., an attending clinician) via a series of steps performed by interacting with GUIs provided on the anesthesia machine and on the remote device. FIGS. 10-13 show example GUIs that may be displayed on the anesthesia machine and on the remote device during this procedure. FIGS. 10 and 11 show example anesthesia machine GUIs, while FIGS. 12 and 13 show remote device GUIs.

FIG. 10 shows an example view 1000 of GUI 502 in which a remote control panel 1004 is displayed on the left side of the GUI, partially obscuring GUI 502. As explained above, a QR code 1006 may be displayed to communicate a session code to a remote device such as care provider device 134. Alternatively, the session code may be manually entered into the remote device, for example an access code 1008 as shown in FIG. 10 may be manually entered into the remote device. FIG. 10 also shows a visual indication 1010 that the session code is available for transmission to the remote device via NFC.

FIG. 11 shows an example view 1100 of remote access menu 1102, which may be displayed in the remote control panel of GUI 502 once remote control has been ceded from the anesthesia machine to the remote device. Display area 1104 may include a notification 1106 that the remote session is active, as well as information on the clinician whom remote control has been granted, or any other relevant information such as the current duration of the session, contact information, and the like. A revoke button 1108 is displayed, which when selected revokes the remote session and returns control to the anesthesia machine. A cancel button 1110 is also displayed, which when selected closes the remote access menu so that the underlying elements of GUI 502 can be seen.

FIGS. 12 and 13 show example GUIs that may be displayed on a remote device, such as care provider device 134, in conjunction with—methods 700, 800, and 900. FIG. 12 shows a set of alternative remote control panel GUIs 1200 for receiving an access code from an anesthesia machine. A remote control panel GUI may be displayed in response to a user input requesting pairing of the remote device with an anesthesia machine, such as in response to user selection of a remote control option in a menu of the supervisory application (e.g., in a context menu displayed in response to user selection of menu button 208 of FIG. 2). In the event that the user chooses to receive the access code by scanning a QR code, the remote device may display a scan frame used to position the remote device at an appropriate distance and orientation with respect to an anesthesia machine such that the QR code 1006 can be properly scanned, as shown in remote control panel 1202. In the event that the user chooses to input the access code manually, the remote device may display a data entry field with a textual prompt for an access code, as shown in remote control panel 1204. In the event that the user chooses to receive the access code via near field communication (NFC), the remote device may display an indication that the access code is available via NFC with any relevant scanning instructions, as shown in remote control panel 1206.

In order for remote device users to be able select their preferred modality for receiving the access code and display the corresponding GUI, a remote control panel may include control elements such as buttons, clickable text, or other navigation options that allow users to navigate between remote control panels 1202, 1204, and 1206, as shown as scan QR button 1208, access code button 1210, and NFC button 1212, respectively. The buttons 1208, 1210, and 1212 may use a visual cue such as highlighting, color change, or a similar visual indication to show which control panel option is currently active on the screen. For example, in remote control panel 1202, scan QR button 1208 is displayed in text having a different color (e.g., blue) than the other buttons, indicating that the GUI for scanning in a QR code is being displayed on the screen. Similarly, in remote control panel 1204, access code button 1210 is displayed in text having a color that indicates that the GUI for manually entering in the access code is being displayed on the screen, and in remote control panel 1206, NFC button 1212 is displayed in text having a color that indicates that the GUI for transferring the access code by NFC is being displayed on the screen.

Remote control panels 1202, 1204, and 1206 are shown for illustrative purposes and may optionally include other or additional display and/or control elements, such as identifying information for the anesthesia machine granting remote access, information about the patient receiving anesthesia treatment, timestamp, or other similar information. In FIG. 13, GUI 1300 shows an example of a settings view of GUI 204 displayed on a remote device, such as care provider device 134, which includes control elements allowing users to remotely make changes to an anesthesia machine. GUI 1300 includes an identification header 204 that identifies the patient whose medical device data/status is being displayed, as explained above with respect to FIG. 2. Because the remote device is authenticated for remote control of the anesthesia machine currently connected to the patient in OR2, a remote connection icon 1301 is displayed next to the patient/room identifier. The top half of GUI 1300 includes an example view of anesthesia machine settings in a tiled layout. For example, the supervisory application may display an interactive tile for $O_2$ as shown at 210, indicating a setting of 80% on the anesthesia machine. Other tiles for different settings (e.g., total flow, SEV, mode, TV, RR, Psupport, etc.) may also be displayed, depending on user customization or selection of default layout. GUI 1300 may also display control features such as a back arrow 206, a settings view button 210, or a context menu 208, as described above.

In GUI 1300, a user may select a tile in order to request a settings change on the anesthesia machine, as shown at tile 210 ($O_2$), wherein a visual indication that the tile has been selected may be provided to the remote device user via a highlighted border, a change of color, luminosity, or by altering any other visual feature of the tile. Upon selecting a tile, a settings control panel 1302 may be displayed, in which one or more display or interactive control elements relating to the selected setting are displayed. The settings control panel 1302 includes a current value for the selected setting (e.g., 95% O2).

As an example, in FIG. 13 a tiled layout comprising individual value tiles may be displayed in the bottom half of GUI 1300, each value tile of which is an interactive control element that allows a user to reset the selected setting according to is the value indicated on the corresponding tile. As described above, a visual indication that the tile has been selected may be provided, for example by a color change as shown at value tile 1304, where the selected tile indicates a desired setting of 80% for oxygen setting tile 210. Once a new setting has been selected, the user may submit a request to change the setting on the anesthesia machine via a control element such as confirmation tile 1306, indicated by a check mark. Confirmation that the setting has successfully been changed may be indicated by updating setting tile 210 to the new setting. By displaying a set of possible value tiles rather than a control box via which the user may enter text/numerals to specify a desired value, a change to the selected setting may be entered faster, which may improve patient care. Further, the values that are displayed via the value tiles may represent all possible values for the setting, in instances where the setting only allows a limited set of possible values.

Switching gears, while FIGS. 5-13 demonstrate a method whereby remote control of an anesthesia machine may be ceded to a remote device by an attending clinician, FIGS. 14-17 demonstrate a method whereby a remote user (e.g., a supervising anesthesiologist) may propose changing a setting on an anesthesia machine, but only with the approval of a local user (e.g., an attending clinician). In other words, some control is ceded to the remote user, such as the ability to see parameter settings and the ability to display notifications on the GUI displayed on the anesthesia machine, without ceding full control as described by methods 700-900 (the ability to directly change settings). As discussed above, in the case where a supervising anesthesiologist wishes to monitor one or more attending clinicians administering anesthesia at the point of care, it may be preferable for control of the anesthesia machine to remain in the hands of the attending clinician.

Figure 14:
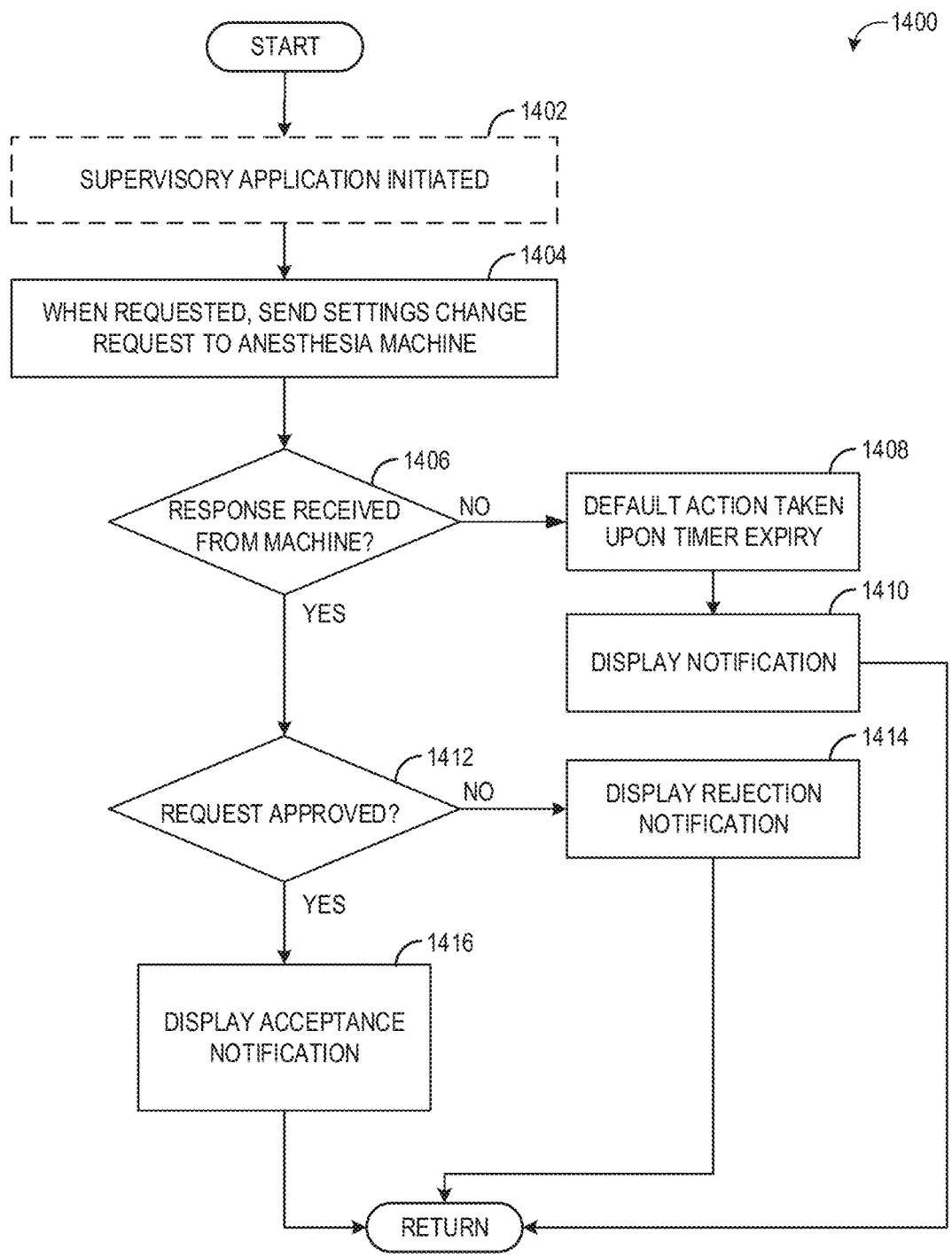
FIGS. 14-15 are flow charts illustrating example methods for requesting a settings change on a life-critical medical device via a graphical user interface displayed on a remote device, from the perspective of the remote device and the life-critical medical device, respectively.

FIG. 14 shows a method 1400 for requesting and establishing remote access to an anesthesia machine via a remote device (e.g., a smart phone, such as care provider device 134). Method 1400 may be carried out according to instructions stored in non-transitory memory of a remote device configured to communicate with an anesthesia machine, such as remote device 508 of FIG. 5 and/or care provider device 134 of FIG. 1B.

At 1402, method 1400 may optionally include initiating a supervisory application, such as the supervisory application 44 discussed above. The supervisory application may be initiated in response to a user request, as described previously. In some examples, the supervisory application may already be initiated, and thus a separate initiation may be dispensed with. At 1404 of method 1400, when a settings change is requested by the remote device (e.g., a request to change a setting of an anesthesia machine), the supervisory application sends the setting change request to the anesthesia machine. At 1406, method 1400 determines whether a response has been received back from the anesthesia machine. If no response is received within a pre-established time limit (e.g., 30 seconds, one minute), at 1408 the anesthesia machine executes a default action, and at 1410 a notification is displayed by the supervisory application on the remote device and the method returns. Notification that the proposed settings change was not made may indicate that the proposed change was not seen by an attending clinician or may have been ignored, which may be displayed on the remote device textually or via a recognizable display element such as an icon, image, or similar visual feature. In the event that a response is received back from the anesthesia machine at 1406, method 1400 determines, at 1412, whether the request was approved or rejected by the attending clinician. As an example, in FIG. 16 the attending clinician may approve or reject a setting via the notification displayed on the anesthesia machine GUI at 1602, by selecting the check mark at 1604 to indicate approval, or by selecting the X at 1606 to indicate rejection. At 1412, if the request is approved by the attending clinician on the anesthesia machine, the supervisory application proceeds to display notification of the acceptance on the remote device at 1416, and the method returns. An example of an acceptance notification displayed on a remote device is shown in FIG. 17. Alternatively, if the request is rejected, the supervisory application displays notification of the rejection on the remote device at 1414 and the method returns.

Figure 15:
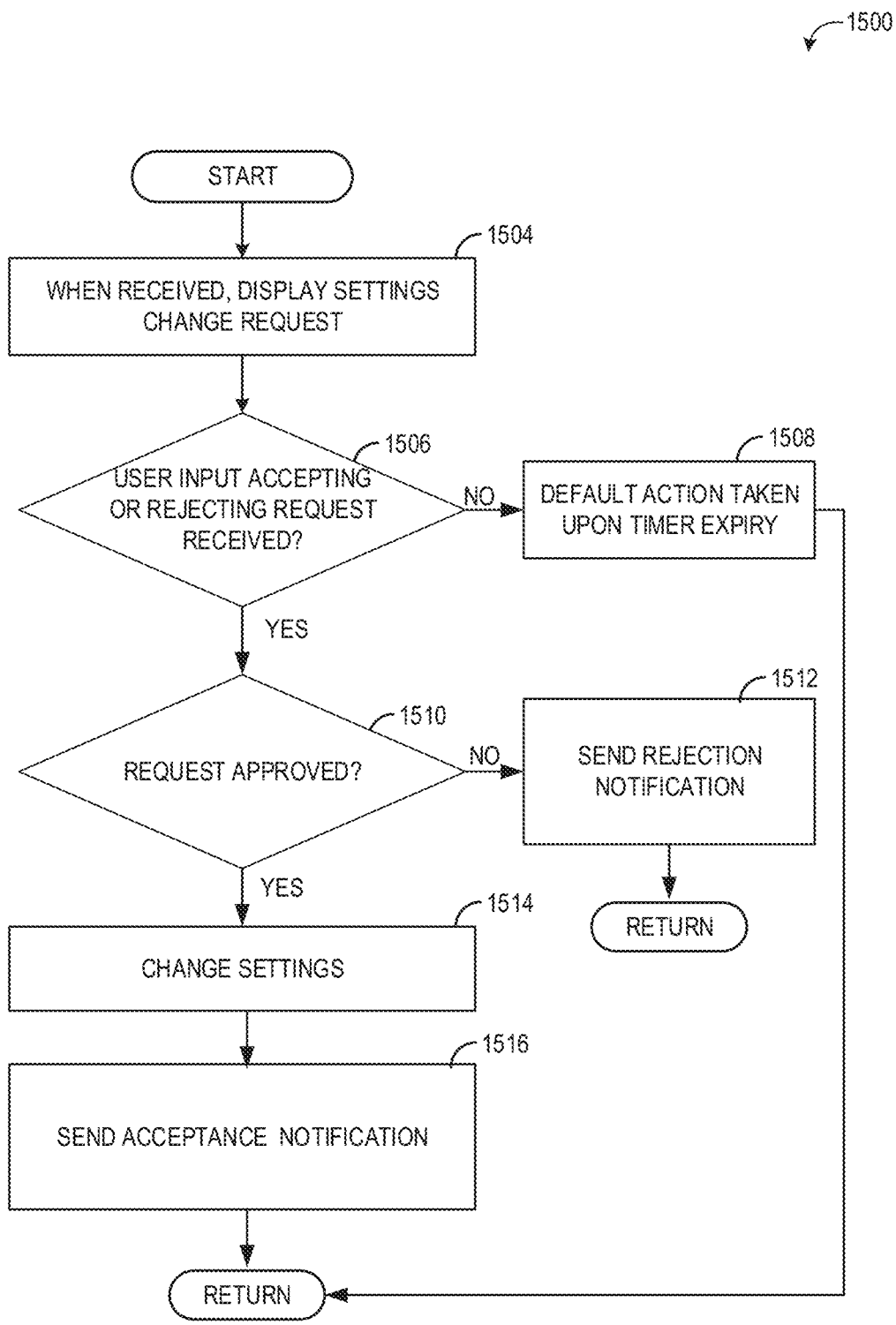

FIG. 15 shows a method 1500 for receiving notifications of proposed settings changes on an anesthesia machine (e.g., anesthesia machine 502), that are sent by a user (e.g., a supervising anesthesiologist) via a remote device (e.g., a smart phone, such as care provider device 134). Method 1500 shows the same procedure described by method 1400, from the perspective of the anesthesia machine, and may be carried out according to instructions stored in non-transitory memory of an anesthesia machine, such as anesthesia machine 502 of FIG. 5.

As with method 1400, method 1500 initiates at 1504 when a settings change request is received from the remote device via the supervisory application. Upon receiving the request, the anesthesia machine displays the request on the anesthesia machine GUI as a notification, as exemplified at 1602 in FIG. 16, and waits for a user (e.g., an attending clinician) to register a response in the form of an acceptance or rejection. If no user input is received by the anesthesia machine at 1506, either accepting or rejecting the request as described above in method 1400, at 1508 a default action is taken upon timer expiry. For example, upon expiration of a timer (e.g., which may expire after 30 seconds, after one minute, or after another suitable amount of time), a default action may be performed. The default action may include sending a timeout notification to the remote device (e.g., indicating that an action was not taken by a user at the anesthesia machine) and/or ceasing to display the settings change request. The method returns. In the event that user input is received from the anesthesia machine at 1506, at 1510 method 1500 proceeds to determine whether the request was approved by the user. If an approval is registered at 1510, the method proceeds to 1514 to change the requested settings on the anesthesia machine. For example, if the requested settings change included a request to change the concentration of oxygen in the air flow provided to the patient currently connected to the anesthesia machine (e.g., from 85% to 80%), the concentration of the oxygen delivered by the anesthesia machine may be changed (e.g., to 80%). At 1516, the anesthesia machine proceeds to send notification of acceptance of the requested settings change to the remote device (e.g., via the supervisory application), and the method returns. Alternatively, if a rejection of the request is registered at 1510, the anesthesia machine sends notification of the rejection of the requested settings change to the remote device at 1512 (e.g., via the supervisory application), and then method 1500 returns. Examples of acceptance and rejection notifications are shown in FIG. 17.

Figure 16:
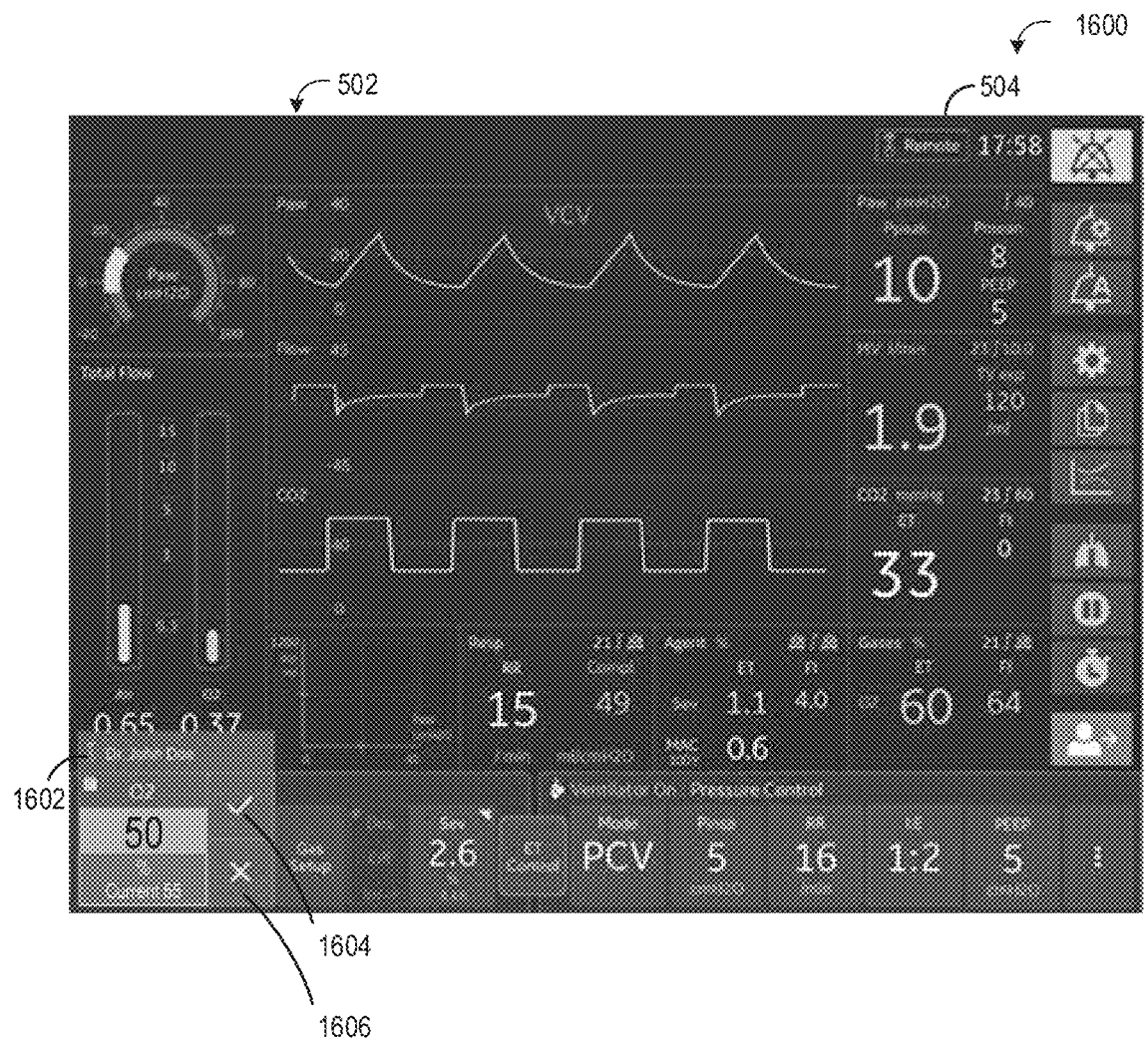
FIG. 16 shows an example view of a notification of a settings change request on a graphical user interface displayed by a life-critical medical device.
Figure 17:
FIG. 17 shows example views of settings change notifications displayed in a graphical user interface on a remote device.

FIG. 16 shows an example view 1600 of anesthesia machine GUI 502, where a notification of a settings change request sent from a supervisory application such as supervisory application 44 is shown at 1602 in the bottom left-hand corner of the GUI. In notification panel 1602, one or more display elements may be included that identify a setting on the anesthesia machine that a remote user (e.g., supervisor) is requesting that the attending clinician change on the anesthesia machine, as well as the new setting requested by the remote user. For example, in notification panel 1602 a settings change request is displayed by the supervisory application for the setting $O_2$, wherein a remote user requests that the setting be changed to 2.2%. Notification panel 1602 may also contain control elements that allow an attending clinician to accept or reject the change request on the anesthesia machine, as shown by a checkmark at 1604 and an X at 1606.

The elements included in notification panel 1602 are for illustrative purposes, and additional or other display or control elements may also be included, for example, the name of the remote supervisor, the time that the notification was displayed, the amount of time remaining before a default action will be taken, or one or more control elements that trigger additional functionality such as messaging, screenshots, etc.

FIG. 17 shows a set of two example remote device GUIs 1700, each of which shows an example notification of a response to a settings change request made by a remote supervisor. Once a settings change request is made via a supervisory application and notified on an anesthesia machine as shown in FIG. 16, a remote device user (e.g., supervisor) may be notified of any acceptance or rejection made by the attending clinician via control elements 1604 or 1606 of FIG. 16. An acceptance notification may be displayed indicating that a settings change has been accepted by the attending clinician, as shown at 1706 in the header of GUI 1702. Alternatively, a rejection notification may be displayed indicating that a settings change has been rejected by the attending clinician, as shown at 1708 in the header of GUI 1704.

Thus, the systems and methods described herein provide for remote control of a life-critical medical device such as an anesthesia delivery machine. Due to the consequences of errors in control of the life-critical medical device (which may negatively impact patient outcomes), the authentication of the remote device may only be performed when the remote device is in proximity of the life-critical medical device, which may increase the security of the life-critical medical device. Further, the remote control of the life-critical medical device may be performed via a supervisory application that provides real-time information to the remote device regarding settings of the life-critical medical device and patient monitoring data of a patient being treated/monitored by the life-critical medical device. The patient monitoring data may be obtained from one or more patient monitoring/medical devices, such as SpO2 monitors, heart rate monitors, and the like. The ability of the user of the remote device to fully monitor the patient from afar may enable the remote control of the life-critical medical device, that otherwise may not be possible due to the user of the remote device not being fully apprised of patient condition and thus unable to make a fully informed decision about when and how to adjust the settings of the life-critical medical device. For example, a remote device that is unable to inform the user of the remote device of all relevant patient monitoring data (such as patient monitoring data from patient monitoring devices other than the life-critical medical device) may allow for errors when the user attempts to enter a settings change for the life-critical medical device, but makes an uninformed (and possibly life-threatening) decision because the user was not aware of all aspects of the patient condition before the settings change was entered and executed. The supervisory application and remote control of the life-critical medical device described herein addresses this issue by providing a specific, dynamically updating list of patient monitoring data. By presenting the remote control of the life-critical medical device in the context of the supervisory application, the in-room environment may be mimicked/presented to the user of the remote device, which may improve patient care while also maintaining the safety of the care providers (e.g., by allowing the care providers to exit the room during x-ray imaging).

An embodiment relates to a system including a life-critical medical device communicatively coupled to a remote device and configured to supply a medical therapy to a patient, the life-critical medical device including a display and memory storing instructions executable to: output, to the display, a graphical user interface (GUI) that displays a plurality of real-time machine settings of the life-critical medical device; responsive to a first user input, display, via the GUI, a remote control panel including a session code usable to authenticate the remote device; and responsive to receiving an indication from an access server that the remote device has been authenticated, display, on the GUI, a notification indicating that the life-critical medical device is currently controlled by the remote device. In a first example of the system, the instructions are executable to, upon receiving the indication that the remote device has been authenticated, change a setting of the plurality of real-time settings responsive to receiving a request from the remote device to change the setting. In a second example of the system, which optionally includes the first example, the notification includes a revoke button, and wherein the instructions are executable to, responsive to user selection of the revoke button, terminate control of the life-critical medical device by the remote device. In a third example of the system, which optionally includes one or both of the first and second examples, the instructions are executable to, upon receiving the indication that the remote device has been authenticated, only change the setting of the plurality of real-time settings responsive to receiving the request from the remote device and not responsive to receiving a user input at the life-critical medical device, until the revoke button is selected. In a fourth example of the system, which optionally includes one or more or each of the first through third examples, the GUI includes a remote control button, and wherein the first user input includes user selection of the remote control button. In a fifth example of the system, which optionally includes one or more or each of the first through fourth examples, the life-critical medical device is an anesthesia machine configured to supply an anesthetic agent to the patient. In a sixth example of the system, which optionally includes one or more or each of the first through fifth examples, the display is a first display, wherein the remote device includes a second display, and wherein the remote device is configured to: output, to the second display, a remote control panel; and responsive to receiving the session code at the remote control panel, send the session code to the access server, the session code usable by the access server to authenticate the remote device. In a seventh example of the system, which optionally includes one or more or each of the first through sixth examples, the remote device is configured to receive the plurality of real-time machine settings of the life-critical medical device and real-time patient monitoring data and, when requested, display one or more of the plurality of real-time machine settings and/or the real-time patient monitoring data on the second display.

An embodiment of a system includes a display; and a computing device operably coupled to the display and storing instructions executable to: output, to the display, a first graphical user interface (GUI) that includes a remote control panel to receive a session code, the session code usable to authenticate the computing device for remote control of an anesthesia machine; output, to the display, a second GUI that includes a plurality of anesthesia machine settings tiles each indicating a respective anesthesia machine setting; responsive to user selection of an anesthesia machine settings tile of the plurality of anesthesia machine settings tiles, display, via the second GUI, a plurality of value tiles for the selected anesthesia machine settings tile, each value tile indicating a possible value for the selected anesthesia machine setting; and responsive to receiving an indication from an access server that the computing device has been authenticated and further responsive to user selection of a value tile of the plurality of value tiles, send a command to the anesthesia machine to adjust the selected anesthesia machine setting to the selected value. In a first example of the system, the anesthesia machine is configured to receive the command and automatically adjust the selected anesthesia machine setting to the selected value in response to receiving the command. In a second example of the system, which optionally includes the first example, the anesthesia machine is configured to only adjust the selected anesthesia machine setting to the selected value in response to receiving the command and not in response to direct user input at the anesthesia machine, until control of the anesthesia machine by the computing device is revoked. In a third example of the system, which optionally includes one or both of the first and second examples, the instructions are executable to, upon receiving the session code, send the session code to the access server. In a fourth example of the system, which optionally includes one or more or each of the first through third examples, the instructions are executable to receive real-time values of the plurality of anesthesia machine settings before, during, and/or after authentication of the computing device.

An embodiment of a system includes a display; and a computing device operably coupled to the display and storing instructions executable to: upon receiving an indication that the computing device has been authenticated for remote control of an anesthesia machine, output, to the display, a first graphical user interface (GUI) that includes a plurality of anesthesia machine settings tiles each indicating a respective anesthesia machine setting; responsive to user selection of an anesthesia machine settings tile of the plurality of anesthesia machine settings tiles, display, via the first GUI, a plurality of value tiles for the selected anesthesia machine settings tile, each value tile indicating a possible value for the selected anesthesia machine setting; responsive to user selection of a value tile of the plurality of value tiles, send a request to the anesthesia machine to adjust the selected anesthesia machine setting to the selected value; and responsive to receiving a response to the request from the anesthesia machine, display, via the first GUI, a notification indicating whether or not the request to adjust the selected anesthesia machine setting was approved by a user at the anesthesia machine. In a first example of the system, displaying, via the first GUI, the notification indicating whether or not the request to adjust the selected anesthesia machine setting was approved comprises receiving a response indicating the request was approved by the user at the anesthesia machine, and in response, displaying the notification, the notification indicating the selected anesthesia machine setting was approved. In a second example of the system, which optionally includes the first example, the display is a first display, and wherein the anesthesia machine is configured to output a second GUI for display on a second display associated with the anesthesia machine, the second GUI including a real-time value for each respective anesthesia machine setting. In a third example of the system, which optionally includes the first example, the anesthesia machine is further configured to, responsive to receiving the request to adjust the selected anesthesia machine setting to the selected value, display, via the second GUI, a notification panel indicating that a user of the computing device has requested to adjust the selected anesthesia machine setting to the selected value, the notification panel including an accept button and a reject button. In a third example of the system, which optionally includes one or both of the first and second examples, the anesthesia machine is configured to adjust the selected anesthesia machine setting to the selected value in response to selection of the accept button and send the response indicating the request was approved to the computing device. In a fourth example of the system, which optionally includes one or more or each of the first through third examples, the instructions are executable to, prior to outputting the first GUI, output, to the display, a remote control panel to receive a session code, the session code usable to authenticate the computing device, and wherein the indication is received from an from an access server upon the access server receiving the session code. In a fifth example of the system, which optionally includes one or more or each of the first through fourth examples, the instructions are executable to receive real-time patient monitoring data from one or more monitoring devices monitoring a patient connected to the anesthesia machine and output the real-time patient monitoring data for display on the display when requested.

The technical effect of remotely controlling a life-critical medical device via a remote device is improved patient care by allowing a clinician to respond to changes in patient state without having to be physically present at the point of care, thereby allowing more rapid response to changes in patient state.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a life-critical medical device communicatively coupled to a remote device and configured to supply a medical therapy to a patient, the life-critical medical device including a display and memory storing instructions executable to:
output, to the display, a graphical user interface (GUI) that displays a plurality of real-time machine settings of the life-critical medical device;
responsive to a first user input, display, via the GUI, a remote control panel including a session code displayed on the GUI and usable to authenticate the remote device;
responsive to receiving an indication from an access server that the remote device has been authenticated, display, on the GUI, a notification indicating that the life-critical medical device is currently controlled by the remote device; and
responsive to receiving an indication from an access server that the remote device has been authenticated, only change a setting of the plurality of real-time settings responsive to receiving a request from the remote device and not responsive to receiving a user input at the life-critical medical device, until a revoke button is selected.

2. The system of claim 1, wherein the notification includes the revoke button, and wherein the instructions are executable to, responsive to user selection of the revoke button, terminate control of the life-critical medical device by the remote device.

3. The system of claim 1, wherein the GUI includes a remote control button, and wherein the first user input includes user selection of the remote control button.

4. The system of claim 1, wherein the life-critical medical device is an anesthesia machine configured to supply an anesthetic agent to the patient.

5. The system of claim 1, wherein the display is a first display, wherein the remote device includes a second display, and wherein the remote device is configured to:
output, to the second display, a remote control panel; and
responsive to receiving the session code at the remote control panel, send the session code to the access server, the session code usable by the access server to authenticate the remote device.

6. The system of claim 5, wherein the remote device is configured to receive the plurality of real-time machine settings of the life-critical medical device and real-time patient monitoring data and, when requested, display one or more of the plurality of real-time machine settings and/or the real-time patient monitoring data on the second display.

7. A system, comprising:
a display; and
a computing device operably coupled to the display and storing instructions executable to:
output, to the display, a first graphical user interface (GUI) that includes a remote control panel to receive a session code, the session code usable to authenticate the computing device for remote control of an anesthesia machine;
output, to the display, a second GUI that includes a plurality of anesthesia machine settings tiles each indicating a respective anesthesia machine setting;
responsive to user selection of an anesthesia machine settings tile of the plurality of anesthesia machine settings tiles, display, via the second GUI, a plurality of value tiles for the selected anesthesia machine settings tile, each value tile indicating a possible value for the selected anesthesia machine setting; and
responsive to receiving an indication from an access server that the computing device has been authenticated and further responsive to user selection of a value tile of the plurality of value tiles, send a command to the anesthesia machine to adjust the selected anesthesia machine setting to the selected value,
wherein the session code is displayed on the anesthesia machine, and
wherein responsive to receiving an indication from an access server that the computing device has been authenticated, the anesthesia machine is configured to only adjust the selected anesthesia machine setting to the selected value in response to receiving the command and not in response to direct user input at the anesthesia machine, until control of the anesthesia machine by the computing device is revoked.

8. The system of claim 7, wherein the anesthesia machine is configured to receive the command and automatically adjust the selected anesthesia machine setting to the selected value in response to receiving the command.

9. The system of claim 7, wherein the instructions are executable to, upon receiving the session code, send the session code to the access server.

10. The system of claim 7, wherein the instructions are executable to receive real-time values of the plurality of anesthesia machine settings before, during, and/or after authentication of the computing device.

11. A system, comprising:
a display; and
a computing device operably coupled to the display and storing instructions executable to:
upon receiving an indication that the computing device has been authenticated for remote control of an anesthesia machine, output, to the display, a first graphical user interface (GUI) that includes a plurality of anesthesia machine settings tiles each indicating a respective anesthesia machine setting;
responsive to user selection of an anesthesia machine settings tile of the plurality of anesthesia machine settings tiles, display, via the first GUI, a plurality of value tiles for the selected anesthesia machine settings tile, each value tile indicating a possible value for the selected anesthesia machine setting;
responsive to user selection of a value tile of the plurality of value tiles, send a request to the anesthesia machine to adjust the selected anesthesia machine setting to the selected value; and
responsive to receiving a response to the request from the anesthesia machine, display, via the first GUI, a notification indicating whether or not the request to adjust the selected anesthesia machine setting was approved by a user at the anesthesia machine,
wherein the anesthesia machine is configured to only adjust the selected anesthesia machine setting to the selected value in response to receiving the request and not in response to direct user input at the anesthesia machine, until control of the anesthesia machine by the computing device is revoked.

12. The system of claim 11, wherein displaying, via the first GUI, the notification indicating whether or not the request to adjust the selected anesthesia machine setting was approved comprises receiving a response indicating the request was approved by the user at the anesthesia machine, and in response, displaying the notification, the notification indicating the selected anesthesia machine setting was approved.

13. The system of claim 12, wherein the display is a first display, and wherein the anesthesia machine is configured to output a second GUI for display on a second display associated with the anesthesia machine, the second GUI including a real-time value for each respective anesthesia machine setting.

14. The system of claim 11, wherein the anesthesia machine is further configured to, responsive to receiving the request to adjust the selected anesthesia machine setting to the selected value, display, via the second GUI, a notification panel indicating that a user of the computing device has requested to adjust the selected anesthesia machine setting to the selected value, the notification panel including an accept button and a reject button.

15. The system of claim 14, wherein the anesthesia machine is configured to adjust the selected anesthesia machine setting to the selected value in response to selection of the accept button and send the response indicating the request was approved to the computing device.

16. The system of claim 11, wherein the instructions are executable to, prior to outputting the first GUI, output, to the display, a remote control panel to receive a session code, the session code usable to authenticate the computing device, and wherein the indication is received from an from an access server upon the access server receiving the session code.

17. The system of claim 11, wherein the instructions are executable to receive real-time patient monitoring data from one or more monitoring devices monitoring a patient connected to the anesthesia machine and output the real-time patient monitoring data for display on the display when requested.

* * * * *